(12) United States Patent
Dhanwal et al.

(10) Patent No.: US 12,323,664 B2
(45) Date of Patent: *Jun. 3, 2025

(54) SYSTEMS AND METHODS FOR PREDICTIVE SELECTION OF PAUSE POINTS

(71) Applicant: Adeia Guides Inc., San Jose, CA (US)

(72) Inventors: Ishan Dhanwal, Haryana (IN); Simranjeet Gill, Punjab (IN); Anjum Makkar, Punjab (IN); Vivek Sehgal, Uttar Pradesh (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,009

(22) Filed: Jan. 11, 2024

(65) Prior Publication Data

US 2024/0223860 A1    Jul. 4, 2024

Related U.S. Application Data

(63) Continuation of application No. 17/504,007, filed on Oct. 18, 2021, now Pat. No. 11,917,251.

(51) Int. Cl.
| | | |
|---|---|---|
| *H04N 21/472* | (2011.01) | |
| *H04N 21/433* | (2011.01) | |
| *H04N 21/442* | (2011.01) | |
| *H04N 21/45* | (2011.01) | |
| *H04N 21/6587* | (2011.01) | |
| *H04N 21/845* | (2011.01) | |

(52) U.S. Cl.
CPC ... *H04N 21/47217* (2013.01); *H04N 21/4333* (2013.01); *H04N 21/44222* (2013.01); *H04N 21/4532* (2013.01); *H04N 21/6587* (2013.01); *H04N 21/8456* (2013.01)

(58) Field of Classification Search
None
See application file for complete search history.

(56) References Cited

U.S. PATENT DOCUMENTS

| | | |
|---|---|---|
| 6,501,902 B1 | 12/2002 | Wang |
| 7,992,163 B1 | 8/2011 | Jerding et al. |
| 8,793,582 B2 | 7/2014 | Johansson et al. |

(Continued)

FOREIGN PATENT DOCUMENTS

WO    2019084181 A1    5/2019

*Primary Examiner* — Heather R Jones
(74) *Attorney, Agent, or Firm* — Haley Guiliano LLP

(57) ABSTRACT

Systems and methods are described for determining that a plurality of user profiles, stored in the memory, are associated with an account of a media application; generating for presentation a media asset during a first consumption session associated with the account; generating for presentation a selectable option to associate a current progress point of the media asset with one or more of the plurality of user profiles associated with the account; receiving a selection of one or more of the plurality of user profiles via the selectable option; during a second consumption session, receiving a request for accessing the media asset; and in response to determining that the second consumption session is associated with the selected one or more user profiles, resuming the media asset from the progress point associated with the selectable option.

20 Claims, 11 Drawing Sheets

(56) References Cited

U.S. PATENT DOCUMENTS

| | | |
|---|---|---|
| 9,294,799 B2 | 3/2016 | Thomas et al. |
| 11,722,740 B2 | 8/2023 | Dhanwal et al. |
| 11,917,251 B2 | 2/2024 | Dhanwal et al. |
| 2002/0129368 A1 | 9/2002 | Schlack et al. |
| 2004/0008970 A1 | 1/2004 | Junkersfeld et al. |
| 2006/0136496 A1* | 6/2006 | Ohashi .................. H04N 7/163 |
| 2008/0092156 A1* | 4/2008 | Ferrone ................. H04H 60/33 |
| | | 725/9 |
| 2013/0034338 A1* | 2/2013 | Ueno .................. G11B 27/105 |
| | | 386/262 |
| 2016/0029057 A1 | 1/2016 | Wickenkamp |
| 2020/0296469 A1 | 9/2020 | Wittke |
| 2021/0136447 A1* | 5/2021 | Daw .................... H04L 65/403 |
| 2023/0119713 A1 | 4/2023 | Dhanwal et al. |

* cited by examiner

| User 402 | Time stamps of viewing media assets 404 | Pause Points 406 | Average browsing time before viewing media asset 408 | Most common browsing method used to find media asset 410 | Most visited section of media application 412 | Average Scroll Rate /Depth 414 | Trick Play Functions per session 416 | Average duration of consumption session 418 | Frequency of skipping supplemental content 420 | IP Address or other identifier of Mobile Device 422 |
|---|---|---|---|---|---|---|---|---|---|---|
| User A | Outer Banks: S1E1: 10/1/21 from 5:00 PM –5:09 PM S1E2: 10/2/21 4:00 PM –4:08 PM  The Dark Knight: 10/3/21 from 1:00 PM – 1:15 PM | Outer Banks: S1E1: 9:01 pause point; S1E2: 8:33 pause point  The Dark Knight: 00:15 pause point | 30 seconds | Scrolling | New Releases | 2 seconds per identifier/ (25%) | 10 | 1 hour | 75% | 192.168.1.12 |
| User B | Outer Banks: 10/1/21 from 5 PM – 5:31 PM; 10/2/21, 4:00 PM – 4:09 PM | Outer Banks: S1E1: 31:01 pause point; S1E2: 8:33 pause point (via user A) | 5 minutes | Search query | Continue Watching | 1 second per identifier/ (10%) | 1 | 30 minutes | 40% | 192.168.1.74 |
| User C | The Dark Knight: 10/1/21 from 1:00 PM – 1:10 PM | The Dark Knight: 00:10 pause point | 2 minutes | Scrolling | Continue Watching | 5 seconds per identifier/ (50%) | 20 | 2 hours | 100% | 192.168.1.97 |

SYSTEMS AND METHODS FOR PREDICTIVE SELECTION OF PAUSE POINTS

CROSS-REFERENCE TO RELATED APPLICATION

This application is a continuation of U.S. patent application Ser. No. 17/504,007, filed Oct. 18, 2021, the disclosure of which is hereby incorporated by reference herein in its entirety.

BACKGROUND

This disclosure is directed to systems and methods for predictive selection of pause points. In particular, techniques are disclosed for selecting a pause point from which to resume a media asset from among multiple pause points associated with the media asset based on identified user interface inputs, and providing an option to associate a pause point from one user profile with another user profile.

SUMMARY

Modern media distribution systems enable a user to access more media content than ever before, and on more devices than ever before. Some media content providers enable a user to subscribe to an account that is associated with multiple user profiles. For example, multiple users within the same household can each have his or her own profile within the media content provider account, such that each profile tracks the respective user's viewing histories separately. On the other hand, some media content providers only offer a single shared user profile that tracks the collective viewing histories of a household, rather differentiating between the viewing histories of individual users.

Each of these approaches has drawbacks, however. For example, in the context of a shared media profile, if multiple users have been viewing the same media asset at different times and stopped viewing the media asset at different pause points, it is difficult for the media content provider to track viewing progress of the multiple users, i.e., the media content provider may store only one of such pause points. In this scenario, at least one of the user's pause points may not be saved and thus that user would not be able to resume the media asset from where he or she left off, and would need to rewind or fast-forward the media asset to navigate to where he or she left off, which may be a cumbersome task that is frustrating to users, and may waste bandwidth, computing resources and networking resources. While a shared media account providing for individual user profiles may allow multiple pause points to be stored in respective user profiles, some users may not have a profile (e.g., a guest of the household) or may be accidentally accessing the user profile of another user. In addition, users often consume content together, but a first user may need to stop watching the content for a variety of reasons, while a second user (e.g., associated with a user profile that requested access to the content) may wish to continue watching the content. However, in these circumstances, the media content provider does not provide a mechanism for the first user that needs to stop watching the content to preserve the progress point of the content at which he or she stopped viewing the content with the other user (e.g., the progress point may only be stored for the second user).

To overcome these problems, systems and methods are provided herein for storing an identification of a first pause point of a media asset associated with a first user interaction profile; storing an identification of a second pause point of the media asset associated with a second user interaction profile; receiving a request to access the media asset during a current consumption session; identifying user interface inputs received during the current consumption session; selecting one of the first pause point and the second pause point as a selected pause point based on determining whether the identified user interface inputs match user interface inputs associated with the first user interaction profile or the second user interaction profile; and generating for presentation the media asset starting from the selected pause point. In some embodiments, the media asset may be generated for presentation from the selected pause point seamlessly, without receiving user or user interface input explicitly selecting which pause point to resume from. In some embodiments, a preview of one or more frames associated with the pause point may be provided to the user, to enable receiving a confirmatory selection from the user indicating that a particular pause point is where he or she left off.

Such aspects enable, e.g., in the context of a media profile shared by multiple users, providing a media asset to a user from a progress point from which the user left off, without requiring the user to fast-forward or rewind through the media asset to locate his or her previous position, e.g., due to another user of the media profile having consumed the media asset until a different progress point of the media asset. Such features may avoid the expenditure of unnecessary bandwidth, computing resources and networking resources, which may be otherwise expended if the user needs to navigate through the media asset to discover the portion he or she left off at, as well as avoiding the presentation of content the user has not yet viewed (e.g., spoilers) that the user may encounter while attempting to discover where he or she left off. The correct pause point may be selected based on analyzing navigation patterns on a user interface of an application provided by a media content provider, which may preserve the privacy of the user (e.g., as opposed to identifying a user based on captured images of the user or other biometric information). In some embodiments, a preview or recap of frames associated with the pause point may be presented to the user to enable the user to verify the correct pause point he or she left off at.

In addition, systems and methods are provided herein for determining that a plurality of user profiles are associated with an account of a media application; generating for presentation a media asset during a first consumption session associated with the account; generating for presentation a selectable option to associate a current progress point of the media asset with one or more of the plurality of user profiles associated with the account; receiving a selection of one or more of the plurality of user profiles via the selectable option; during a second consumption session, receiving a request for accessing the media asset; and in response to determining that the second consumption session is associated with the selected one or more user profiles, resuming the media asset from the progress point associated with the selectable option.

Such aspects enable, e.g., in the context of a media account shared by multiple users having respective user profiles as part of the account, preserving a progress point he or she reached while consuming content with another user associated with the media account. For example, in the context of a family consumption session or group watching session, if a group begins consuming content together on one profile, but a user needs to stop watching the content (e.g., to leave for work, to cook dinner, etc.), such user may be provided with the ability to associate the pause point he or she left off at with his or her profile, in order to later finish consuming the content from the saved pause point. Thus, such user may avoid the need to fast-forward or rewind through the media asset to locate his or her previous position, as well as avoid the need to remember which media asset (e.g., which episode of a series) he or she was watching with the group in order to locate the media asset. In addition, such features may avoid the expenditure of unnecessary bandwidth, computing resources and networking resources, that may be otherwise expended if the user needs to navigate through the media asset to discover the point he or she left off at and/or the media asset itself, as well as avoiding the presentation of content the user has not yet viewed (e.g., spoilers) that the user may encounter while attempting to discover where he or she left off.

In some embodiments, the provided systems and methods further comprise monitoring user interface inputs received over time, and determining, based on the monitored user interface inputs, a plurality of user interaction profiles for respective users.

In some aspects of this disclosure, generating for presentation the media asset starting from the selected pause point comprises generating for presentation a preview frame associated with the selected pause point.

In some embodiments, the provided systems and methods further comprise determining a confidence score associated with whether the user interface inputs match user interface inputs associated with the first user interaction profile or the second user interaction profile; and in response to determining the confidence score exceeds a predefined threshold, generating for presentation the media asset from the first pause point without generating for presentation a preview of the media asset.

In some aspects of this disclosure, the provided systems and methods further comprise determining a confidence score associated with whether the user interface inputs match user interface inputs associated with the first user interaction profile or the second user interaction profile, and, in response to determining the confidence score exceeds a predefined threshold, pre-fetching a portion of the media asset associated with the selected pause point. Such aspects enable pre-buffering a media asset from an anticipated resume position, e.g., the system may begin buffering as soon as the user interface inputs are correlated to a particular user interaction profile and pause point stored for the media asset in connection with such profile.

In some embodiments, the first user interaction profile and second user interaction profile respectively comprise a plurality of time stamps associated with a plurality of times during which the media asset and related media assets were accessed and navigation patterns associated with user interface inputs. In some embodiments, the navigation patterns indicate, for the first user interaction profile and the second user interaction profile, one or more of a most commonly accessed portion, whether accessing media assets is more commonly performed via search query commands or scroll commands, a scrolling rate, a frequency of receiving requests to perform trick-play functions, past durations of consumption sessions, and frequency of skipping supplemental content.

In some aspects of this disclosure, the media asset is being generated for display on a first device, and the first pause point is associated with pausing the media asset, generated for display on the first device, based on receiving a pause command from a second device. In some aspects of this disclosure, determining whether the identified user interface inputs match identified user interface inputs associated with the first user interaction profile or the second user interaction profile may comprise determining the request to access the media asset was received from the second device.

In some embodiments, the provided systems and methods further comprise generating for presentation respective previews for each pause point of the media asset. In some embodiments, generating for presentation respective previews for each pause point of the media asset comprises generating for presentation, for each pause point, a frame of the media asset prior to the pause point, wherein the preview for the second pause point comprises a frame of the media asset occurring prior to the second pause point and after the first pause point.

In some aspects of this disclosure, the provided systems and methods further comprise in response to receiving the request for accessing the media asset and determining that the second consumption session is associated with the selected one or more user profiles, providing a selectable option to resume the media asset from the progress point associated with the selectable option.

In some embodiments, the media asset is generated for presentation on a first device, and the selectable option is generated for presentation on the first device.

In some aspects of this disclosure, the media asset is generated for presentation on a first device, and the selectable option is generated for presentation on a second device in the vicinity of the first device.

In some aspects of this disclosure, the provided systems and methods further comprise determining that a plurality of users associated with respective user profiles of the plurality of user profiles are consuming the media asset during the first consumption session.

In some embodiments, determining that the plurality of users associated with respective user profiles of the plurality of user profiles are consuming the media asset during the first consumption session comprises determining that a first user profile initiated the first consumption session and determining that a second user profile comprises an indication that media assets related to the media asset of the first consumption session were previously consumed.

In some aspects of this disclosure, determining that the plurality of users associated with respective user profiles of the plurality of user profiles are consuming the media asset during the first consumption session comprises determining, based on sensor data, that users associated with a first user profile and a second user profile, respectively, are consuming the media asset during the first consumption session.

In some embodiments, determining that the plurality of users associated with respective user profiles of the plurality of user profiles are consuming the media asset during the first consumption session comprises receiving input indicating that the users associated with the first user profile and the second user profile, respectively, are consuming the media asset during the first consumption session.

In some aspects of this disclosure, the provided systems and methods further comprise determining that a user associated with a particular user profile is not consuming the media asset during the first consumption session; and in response to determining that the user associated with the particular user profile is not consuming the media asset during the first consumption session, declining to generate for presentation the selectable option. In some embodiments, determining that the user associated with the particular user profile is not consuming the media asset during the first consumption session comprises determining that media assets indicated in the particular user profile are not related to the media asset being consumed during the first consumption session.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows illustrative data structures of user interaction profiles stored in a user consumption data database, in accordance with some embodiments of this disclosure;

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

Figure 1:
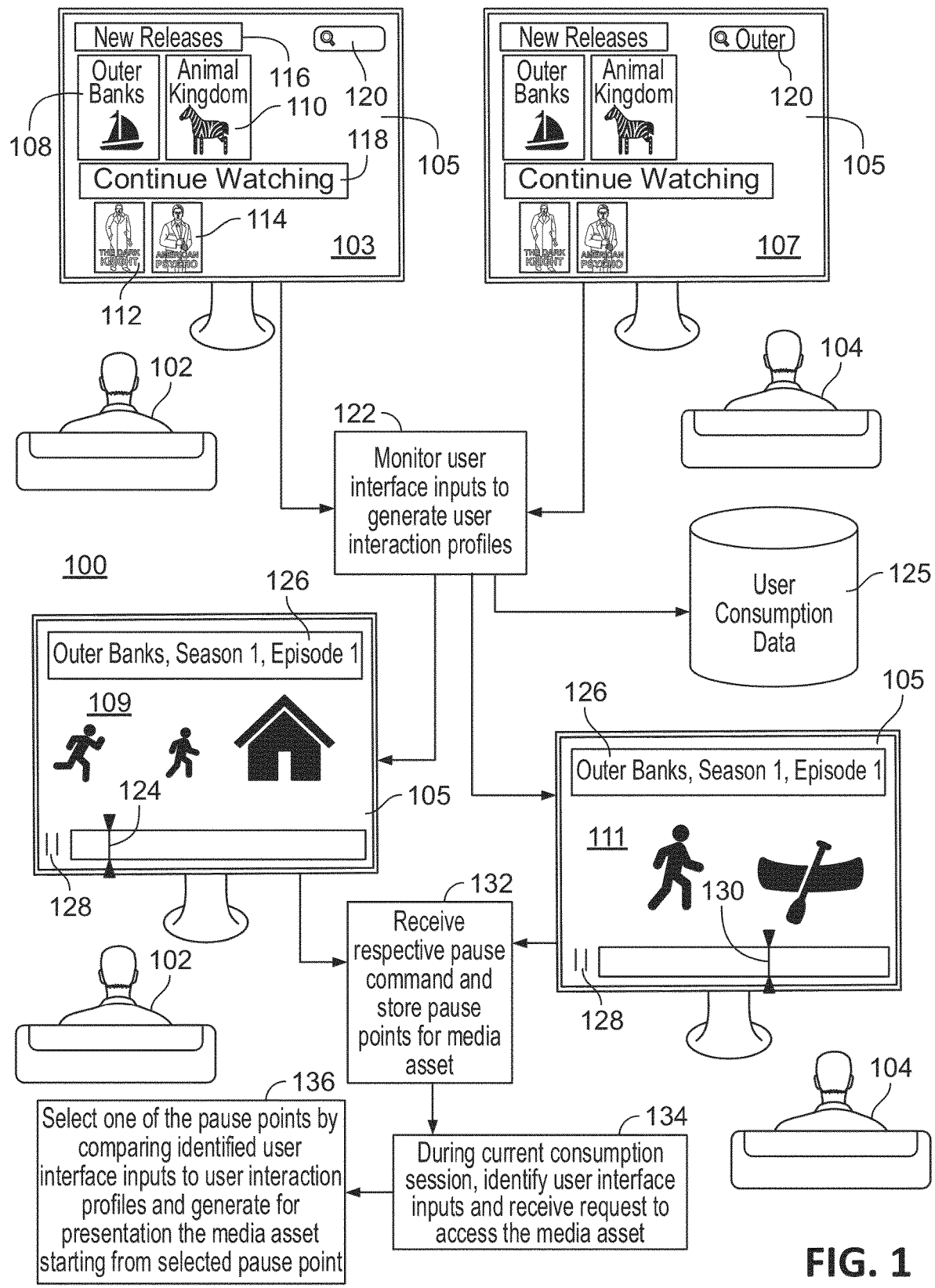
FIG. 1 shows a block diagram of an illustrative system for generating for presentation a media asset starting from a selected pause point, in accordance with some embodiments of this disclosure.

FIG. 1 shows a block diagram of an illustrative system 100 for generating for presentation a media asset starting from a selected pause point, in accordance with some embodiments of this disclosure. A media application (e.g., executed at least in part on user equipment device 105 and/or a remote server, such as, for example, media content source 602 and/or server 604) may generate for display user interface 103 comprising one or more media asset identifiers 108, 110, 112, 114 corresponding to respective media assets, during a consumption session associated with the media application and user 102. In some embodiments, media asset identifiers 108 and 110 may be associated with media asset category 116, and media asset identifiers 112 and 114 may be associated with media asset category 118. User interface 103 may comprise search bar 120 at which queries for media assets may be received from a user. Media asset 126 may be generated for display from a broadcast or stream received at user equipment device 105 in association with the media application, or from a recording stored in a memory of user equipment device 105 and/or a remote server. User equipment device 105 may be, e.g., a television and/or may include an integrated display, e.g., on a smartphone or tablet, or may be connected to an external display device, e.g., a television.

User interface 107 may be provided to user 104 in a separate consumption session associated with the media application and user 104, e.g., occurring prior to, or subsequent to, the consumption session of user 102. Such separate consumption session may be associated with user equipment device 105 or any other suitable device capable of accessing the shared media account or profile. In some embodiments, users 102 and 104 may be accessing the media application using a shared media account or shared media profile, e.g., accessible via the same login credentials of a user with a media content provider. In other words, the media application may not be able to determine which of user 102 or user 104 is accessing the media application on the basis of received login credentials or based on a selected user profile.

At 122, the media application may monitor user interface inputs received from users 102 and 104 to generate respective user interaction profiles, and cause such user interaction profiles to be stored in database 125, as shown in more detail in connection with FIG. 4. User interface inputs may be monitored by the media application over any suitable period of time. In some embodiments, the user interaction profiles may be transparent to the user, e.g., users 102 and user 104 may interact with the media application by logging in to a shared user account or profile that may not be specific to user 102 or user 104. The media application may monitor, for inclusion in the user interaction profiles, any suitable number of types of user interface inputs, e.g., a most commonly accessed portion of the media application, whether accessing media assets is more commonly performed via search query commands or scroll commands, a scrolling rate and/or scrolling depth, a frequency of receiving requests to perform trick-play functions, past durations of consumption sessions, frequency of skipping supplemental content, etc. For example, the media application may build user interaction profiles for users 102 and 104 comprising historical navigation patterns and consumption history for each user, such that the media application may predict whether user 102 or user 104 is accessing the media application during a current consumption session by comparing user interface inputs received during the current consumption session to user interface inputs associated with the respective user interaction profiles. The media application may monitor user interface inputs received prior to the consumption sessions of users 102 and 104 depicted in FIG. 1, as well as subsequent to such consumption sessions.

As shown at user interfaces 109 and 111 separately corresponding to consumption sessions of users 102 and 104, respectively, the media application may generate for presentation media asset 126 (e.g., an episode of the media asset associated with media asset identifier 108). The media application may generate for presentation media asset 126 based on receiving input selecting identifier 108 shown in media asset category 116 or based on receiving a query via search bar 120 requesting access to media asset 126. The media application may receive the query in any suitable format (e.g., text-based input via a remote control or keyboard or other input device, audio or voice input, touch input, biometric input, or any combination thereof) via a suitable interface (e.g., input interface 510, microphone 518 of FIG. 5, etc.).

At 132, the media application may receive a pause command from user 102, e.g., associated with pause icon 128, to pause media asset 126 at pause point 124 within the presentation of media asset 126. In addition, at 132, the media application may receive (e.g., at a later time than the pause command is received from user 102) a pause command from user 104, e.g., associated with pause icon 128, to pause media asset 126 at pause point 130 within the presentation of media asset 126. Pause point 130 may correspond to a different location within media asset 126 than pause point 124, e.g., pause point 130 may occur prior to, or after, pause point 124 within media asset 126. In some embodiments, the request to access media asset 126 is received from user 104 subsequent to the request to access media asset 126 received from user 102 and/or the pause command associated with icon 128 from user 102. In such instance, the media application may determine to play media asset 126 from the beginning, as opposed to from the pause point associated with user 102, based on determining that user interface inputs associated with the consumption session of user 104 do not correspond to user interface inputs corresponding to the first user interaction profile associated with user 102. Indicators of pause point 124 and pause point 130 may be stored in connection with the respective user interaction profiles in database 125. In some embodiments, pause points 124 and/or 130 may be stored in response to, e.g., a user exiting the media application, a device associated with playing of media asset 126 being powered off, or any request to otherwise cease or stop access of media asset 126.

At 134, the media application may determine that another consumption session has been initiated, e.g., a current consumption session, occurring subsequent to the consumption sessions during which pause point 124 and pause point 130 were stored in connection with the respective user interaction profiles in database 125. In some embodiments, the media application illustrated in FIG. 1 may provide a shared user account or profile such that the media application may not be able to determine which of user 102 or user 104 is using the media application based on login credentials alone, and the particular user device 105 being used may not be indicative of which of user 102 or user 104 is associated with the current consumption session. The media application may identify user interface inputs during the current consumption session, and receive a request to access the media asset.

At 136, the media application may compare the identified user interface inputs during the current consumption session to user interface inputs associated with the user interaction profiles. For example, during the current consumption session, the media application may receive selection of media asset 126 via identifier 108 contained in media asset category 116, in which case the media application may determine that the current consumption session corresponds to the first user interaction profile, e.g., if the first user interaction profile is commonly associated with selecting media assets from media asset category 116, and/or consumption sessions at the particular time of day or day of the week of the current consumption session. On the other hand, during the current consumption session, the media application may receive selection of media asset 126 discovered by way of a query via search bar 120, in which case the media application may determine that the current consumption session corresponds to the second user interaction profile, e.g., if the second user interaction profile is commonly associated with selecting media assets discovered by way of a query via search bar 120, and/or consumption sessions at the particular time of day or day of the week of the current consumption session.

The media application may select one of pause point 124 or pause point 130 based on the comparison of the identified user interface inputs. For example, in response to determining that the user interface inputs of the current consumption session match user interface inputs stored at user consumption database 125 in connection with the first user interaction profile, the media application may cause media application 126 to be generated for display from pause point 124 associated with the first user interaction profile. In some embodiments, the media application may cause media asset 126 to be generated for display from pause point 124 automatically in response to the determination that the user interface inputs of the current consumption session match user interface associated with the first user interaction profile, or a selectable option may be generated for presentation at user equipment device 105 for user confirmation of pause point 124. In some embodiments, one or more previews of pause point 124 may be generated for display by the media application, as discussed in more detail in connection with FIG. 2. In some embodiments, if during the current consumption session the media application receives input to restart a particular media asset from the beginning, the media application may use this as an indication that the consumption session is associated with a user interaction profile that has not yet viewed the media asset and thus is not associated with a stored pause point. In some embodiments, a user interaction profile associated with a current consumption session may be identified based on detections by one or more sensors (e.g., a camera attached to user equipment device 105, a smart lock associated with a room in which user equipment device 105 is positioned, detecting a user device of a particular user, such as a mobile phone, is in a vicinity of user equipment device 105, etc.), such as by comparing sensor data determined by the one or more sensors with information stored in association with the user interaction profiles.

Figure 2:
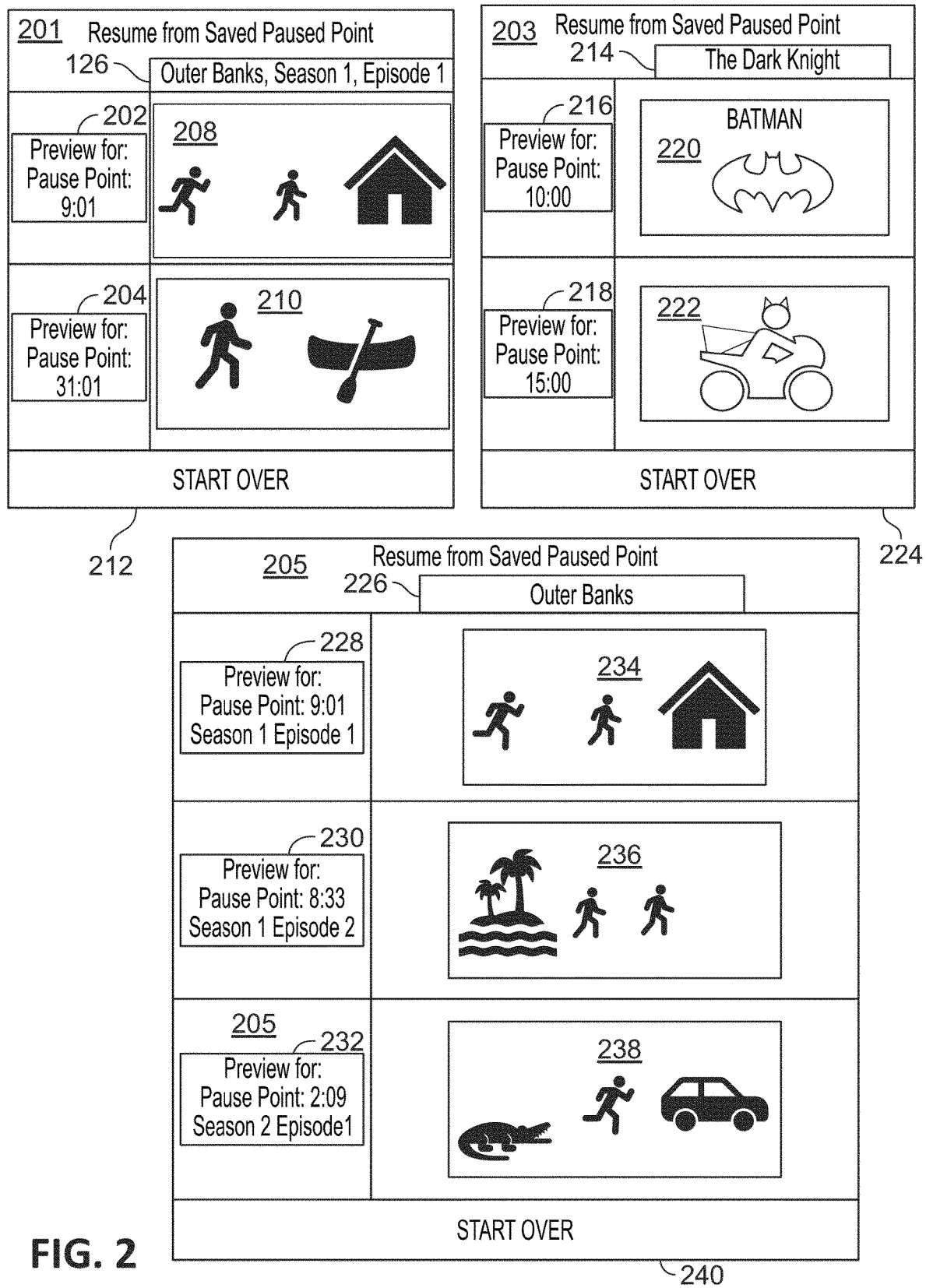
FIG. 2 shows illustrative user interfaces for presenting previews associated with pause points of media assets, in accordance with some embodiments of this disclosure.

FIG. 2 shows illustrative user interfaces for presenting previews associated with pause points of media assets, in accordance with some embodiments of this disclosure. It should be noted that the embodiments discussed in connection with FIG. 2 may be implemented alternatively or in addition to the embodiments discussed in connection with FIG. 1. The media application may generate for presentation user interface 201 in connection with media asset 126. User interface 201 may comprise identifiers 202 and 204 respectively associated with pause points 124 and 130 of media asset 126, an indication of media asset 126, one or more frames of preview 208 associated with pause point 124 indicated at 202, one or more frames of preview 210 associated with pause point 130 indicated at 204, and a selectable option 212 to restart the presentation of media asset 126 from a beginning of media asset 126. In some embodiments, the preview frames may be associated with a short clip (e.g., 5-10 seconds) prior to and/or encompassing a particular pause point, an animation associated with the particular pause point, still images of one or more frames associated with the particular pause point, audio associated with one or more frames, or any combination thereof, or any other suitable representation of the particular pause points to serve as a refresher to the user of the location in media asset 126 at which he or she left off. In some embodiments, in response to receiving a pause command or other command to cease access of a media asset, the media application may capture one or more frames associated with the pause point and/or prior to the pause point for use in generating the preview frames. In some embodiments, the media application may identify frames (e.g., based on metadata of the frame and/or image or audio processing techniques to identify objects of interest) to be included in the preview based on whether the frames contain memorable aspects, e.g., a famous actor, a critical or exciting scene in the media asset, etc.

In some embodiments, preview frames may be presented at the user interfaces of FIG. 2 in response to determining that a confidence score of whether the identified user interface inputs match user interface inputs associated with the first user interaction profile or the second user interaction profile is below a predefined threshold. For example, if the media application determines that a likelihood of user interface inputs of the current consumption session matching a particular user interaction profile is below a threshold of, e.g., a score of 50%, preview frames 208, 210 may be presented prior to generating for presentation media asset 126 from the selected pause point, to receive user confirmation of the correct pause point based on the preview frame prior to generating for display media asset 126 from the selected pause position.

In some embodiments, to avoid showing a user one or more spoilers in connection with the preview frames of a progress point of media asset 126 that he or she has not yet reached, the media application may provide the preview frames 208, 210 one at a time, where the order of providing the preview frames corresponds to first showing an earlier pause point preview frame within the presentation of media asset 126. For example, user input may be received indicating that frame 208 does not correspond to the pause point of the user associated with the current consumption session, and in response to receiving such input, preview frame 210 may be generated for presentation to enable user selection of preview frame 210 (or media asset 126 may be generated for presentation from the pause point indicated at 204, if such pause point is the only remaining stored pause point after receiving the user input). In some embodiments, if the media application determines that the pause point indicated at 202 is more likely to correspond to the user associated with the current consumption session than the pause point indicated at 204, preview frame 208 associated with the pause point indicated at 202 may be displayed in an emphasized manner as compared to preview frame 210, e.g., larger, more conspicuous color scheme or formatting, and/or more prominent position within user interface 201. In some embodiments, using the techniques discussed in connection with FIG. 1, the media application may predict which pause point corresponds to a particular user, and may highlight a certain preview frame corresponding to that pause point, or sort the preview frames to show the preview frame associated with the predicted pause point to be first within the list of preview frames, such as, for example, at a top of the screen or otherwise more prominently shown to the user.

User interface 203 may be provided by the media application in connection with media asset 214, e.g., a movie titled "The Dark Knight," where multiple pause points indicated at 216, 218 may be stored in connection with media asset 214, where the pause points 216, 218 may respectively correspond to preview frames 220, 222. User interface 203 may further include selectable option 224 to restart the presentation of media asset 126 from a beginning of media asset 126. In some embodiments, the preview frames (e.g., preview frames 220, 222) for particular pause points may correspond to I-Frames of one or more segments that immediately precede the pause points. For example, if one of the pause points corresponds to segment 500 in the manifest of media asset 214, then the I-frames from previous segments may be displayed in succession (e.g., I-Frames from 495, 496, etc.). In some embodiments, one or more I-frames associated with a main plot or other significant scene occurring prior to the pause point indicated at 218, but after the pause point indicated at 216, may be used. In some embodiments, an audiovisual clip may be used as preview 220 in response to determining that preview 220 is associated with the earliest stored pause point for media asset 214, whereas preview 222 may correspond to still images, e.g., to avoid preview 222 acting as a spoiler to a user associated with the pause point indicated at 216, whereas the same concerns may not exist for preview 220 associated with the pause point indicated at 216, since the user of the current consumption session is likely associated with pause point 216 or pause point 218 and thus either way has encountered the frames associated with preview frame 220.

In some embodiments, the media application permits a user to perform pause and resume operations using his or her mobile device, and the pause point may be saved on the mobile device and/or at remote storage accessible by the mobile device. Thus, the pause point may be associated with a specific mobile device, regardless of whether a media account is associated with multiple profiles. In such scenario, if the media application determines that a mobile device requesting access to a media asset associated with multiple pause points is the same mobile device that is indicated in a particular user interaction profile (e.g., the user is attempting to resume the media asset using the mobile device as a remote control in a current consumption session, and the user previously used the mobile device to interact with the media asset or another media asset in a prior consumption session), the pause point associated with the particular user interaction profile comprising the indication of the mobile device may be automatically selected. In some embodiments, such pause point may be automatically selected based on the media application computing a high confidence score (e.g., exceeding a predefined threshold) that the current consumption session is associated with the particular user interaction profile comprising the indication of the mobile device. In some embodiments, such high confidence score causes the presentation of the previews of FIG. 2 to be conditional, e.g., there may be no need to present a preview frame of any pause points, or present any other pause points, since the media application is sufficiently confident that the current consumption session corresponds to the particular user interaction profile, on the basis of the same mobile device being associated with each of the current consumption session and particular user interaction profile associated with the prior consumption session that also utilized the mobile device.

User interface 205 may be provided by the media application in connection with media asset collection 226, e.g., an episodic series of a plurality of episodes spanning one or more seasons. User interface 205 may comprise the pause points indicated at 228, 230, 232 for respective episodes of media asset collection 226 from one or more seasons thereof, where the pause points indicated at 228, 230, 232 may respectively correspond to preview frames 234, 236, 238. In some embodiments, if the media application receives selection of, e.g., identifier 108, user interface 205 may be generated for presentation comprising a list of each episode of the series associated with identifier 108 having a stored pause point. In some embodiments, a short recap of the plot of the media asset prior to the selected pause point may be automatically presented or provided for user selection to view, depending on a length of time since last viewing the media asset, to refresh a user's memory.

Figure 3:
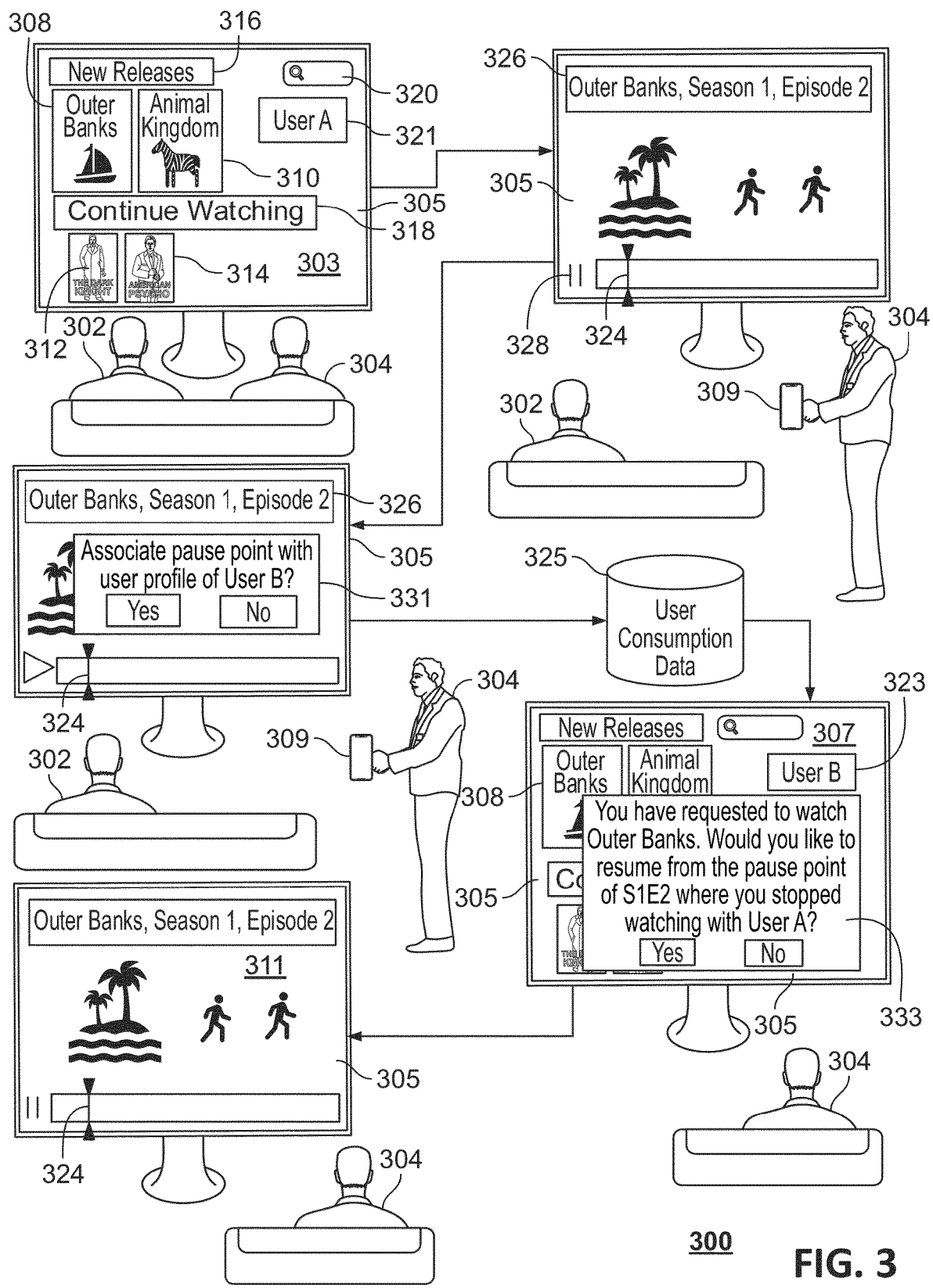
FIG. 3 shows a block diagram of an illustrative system for associating a current progress point of a media asset with one or more user profiles associated with a media application account, in accordance with some embodiments of this disclosure.

FIG. 3 shows a block diagram of an illustrative system 300 for associating a current progress point of a media asset with one or more user profiles associated with a media application account, in accordance with some embodiments of this disclosure. The media application may generate for display user interface 303 comprising one or more media asset identifiers 308, 310, 312, 314 corresponding to respective media assets, during a consumption session associated with the media application and user 302. In some embodiments, media asset identifiers 308 and 310 may be associated with media asset category 316, and media asset identifiers 112 and 114 may be associated with media asset category 318. User interface 303 may comprise search bar 320 at which queries for media assets may be received from a user. Media asset 326 may be generated for display from a broadcast or stream received at user equipment device 305 in association with the media application, or from a recording stored in a memory of user equipment device 305 and/or a remote server. User equipment device 305 may be, e.g., a television and/or may include an integrated display, e.g., on a smartphone or tablet, or may be connected to an external display device, e.g., a television.

In some embodiments, users 302 and 304 may be, e.g., members of the same household taking part in a group consumption session in association with the media application, accessing the media application using a user profile 321 of user 302, where each of user 302 and 304 may be associated with a respective user profile within a single account of the media application. The media application may generate for consumption media asset 326 based on input received from user 302 or user 304. During the playing of media asset 326, user 304 may need to stop consuming media asset 326 for any of a variety of reasons, but user 302 may desire to continue consuming media asset 326 (being viewed on the user profile of user 302) at the current time. User 304 may desire to preserve information related to progress point or pause point 324, since user 304 may wish to continue consuming media asset 326 at a later time, and user 304 may wish to avoid forgetting which media asset he or she was consuming with user 302 during the group consumption session as well as forgetting a progress point of the media asset when user 304 stopped consuming media asset 326. The media application may provide selectable option 331 to associate pause point 324 with one or more user profiles associated with the account of the media application. In some embodiments, selectable option 331 may be generated for display as an overlay, overlapping media asset 326. In some embodiments, selectable option 331 may be implemented as a special command, e.g., "Pause to Resume on Profile B" which enables a user (e.g., user B corresponding to user 304) associated with profile B (corresponding to profile 323) to resume the media asset from the associated progress point from his or her own profile.

Selectable option 331 may be provided by the media application in response to one or more of a variety of occurrences. For example, upon receiving a pause command associated with identifier 328 (or any other suitable input during playing of media asset 326) such as, for example, from user 302 or user 304, the media application may generate for presentation selectable option 331. In some embodiments, selectable option 331 may comprise a list indicating each user profile associated with the account and an icon (e.g., a checkbox) for each respective user profile, to enable selection of any suitable number of user profiles to be associated with progress point 324. In some embodiments, selectable option 331 may be provided based on receiving input indicating which users are consuming content during a current consumption session. In some embodiments, if a current time of the current consumption session corresponds to a time that user 304 typically consumes content, e.g., as indicated in the user profile of user 304 stored at database 325, the media application may determine that user 304 is likely involved in the consumption session, and thus may determine to provide selectable option 331, e.g., when a pause command is received or when playing of media asset 326 is otherwise ceased prior to the end of media asset 326. In some embodiments, selectable option 331 may be provided in response to determining that media asset 326 is similar to media assets associated with the user profile of user 304, e.g., if user 304 recently watched the previous episode in the season of episodes associated with media asset 326. In some embodiments, selectable option 331 may be provided in response to determining that user 304 is leaving a vicinity of user equipment device 305. For example, sensor data determined by one or more sensors (e.g., a camera, biometric sensor, smart lock, etc.) may be used to identify the presence of user 304 during the group consumption session and his or her subsequent exiting of the vicinity of user equipment device 305.

In some embodiments, a second screen device 309 (e.g., a smart phone associated with the user profile of user 304) may be in communication over a network (e.g., network 606 of FIG. 6) with user equipment device 305. The media application may determine, e.g., based on varying Received Signal Strength Indicator (RSSI) signals between second screen device 309 and user equipment device 305, that user 304 was initially present during the current consumption session but is now exiting the vicinity of user equipment device 305, and in response to this determination may provide selectable option 331 at second screen device 309 or at user equipment device 305. In some embodiments, selectable option 331 may be provided by the media application on second screen device 309, e.g., so as not to interrupt the consumption session of user 302 when user 304 is not able to continue consuming media asset 326. Selectable option 331 may be provided to second screen device 309 in any suitable manner, e.g., via an email message to an email address specified in the user profile, via a text message to a phone number specified in user profile, a notification in association with a mobile application associated with the media application, etc. Conversely, the media application may decline to provide selectable option 331 upon determining that user 302 is likely to be consuming content alone. For example, such determination may be made based on input from the user, sensor data indicating user 302 is alone, determining that media asset 326 is unrelated to media assets indicated as being consumed in connection with other user profiles stored in database 325, or any combination thereof. While selectable option 331 is shown in the example of FIG. 3 as providing the capability of associating pause point 324 with user profile 323 associated with user 304, one or more selectable options may be provided in accordance with the aforementioned techniques to provide multiple user profiles (e.g., each user profile associated with the account) the option of associating pause point 324 with the respective user profile.

The media application may provide user interface 307 in connection with a subsequent second consumption session that is associated with user profile 323 and user 304. The second consumption session may occur in association with user equipment device 305, or any other suitable device capable of running the media application and providing content to user 304. The media application may determine that media asset 326 associated with identifier 308 of user interface 307 is associated with pause point 324, based on an indication stored in connection with user profile 323 stored in database 325, based on an affirmative selection ("Yes") of selectable option 331 in connection with the first consumption session, e.g., the group consumption session of user 302 and 304. In some embodiments, in response to receiving selection of identifier 308, the media application may automatically resume playing of media asset 326 from pause point 324 having been associated with user profile 323, as shown at user interface 311 of user equipment device 305. In some embodiments, selectable option 333 may be provided, prior to generating for presentation user interface 311, to enable user 304 to confirm that he or she wishes to resume from pause point 324 of media asset 326. In some embodiments, preview frames associated with pause point 324, such as discussed in connection with FIG. 2, may be employed in connection with the example of FIG. 3, e.g., preview frames of pause point 324 may be provided to user 304 to ensure that he or she wishes to resume from pause point 324.

In some embodiments, the techniques of FIG. 3 may be used within a household even if users are accessing different accounts within the media application that are unrelated to each other. For example, the media application may detect that historically, multiple accounts having different login credentials have been accessed from a particular IP address (e.g., associated with a particular household). Using the techniques of FIG. 3, the media application may determine that a first user associated with the first account and a second user associated with a separate second account are consuming content together, and provide an option to a second user to associate a progress point associated with the first account with the second account.

FIG. 4 shows illustrative data structure 400 of user interaction profiles stored in a user consumption data database, in accordance with some embodiments of this disclosure. Data structure 400 may be stored in database 125 (which may correspond to database 325), and may comprise any suitable amount or types of data (e.g., user interface inputs, consumption data) associated with respective users of the media application. For example, column 402 may correspond to identifiers of user interaction profiles or user profiles associated with a particular account of the media application; column 404 may correspond to identifiers of time stamps of consumed media assets; column 406 may correspond to progress points or pause points of consumed media assets; column 408 may correspond to the average amount of time a user browses before viewing a media asset; column 410 may correspond to the most common browsing method used to find media asset (e.g., scrolling through media asset identifiers, or searching via a query for media assets); column 412 may correspond to the most visited section of the media application (e.g., "New Releases," "Continue Watching," etc.); column 414 may correspond to an average scroll rate (e.g., how fast a particular user scrolls through the media application) and/or a scroll depth (e.g., a percentage of a particular screen a user typically scrolls through prior to consuming content); column 416 may correspond to a typical amount of trick play functions (e.g., fast-forward, rewind, skip, variable speed consumption) during consumption sessions; column 418 may correspond to a typical duration of consumption sessions by the user, such as based on a day of the week or time of day; column 420 may correspond to a frequency of skipping supplemental content (e.g., advertisements); and column 422 may correspond to an IP address or other identifier of a mobile device of a particular user, e.g., used to consume content or as a remote control to control playing of a media asset on user equipment device 305. In some embodiments, data structure 400 may comprise metadata indicating attributes of consumed media assets, e.g., genre, actors, keywords, director, etc.).

The user account and/or user profile and/or user interaction profile information stored in association with data structure 400 may be built over time by monitoring user interface inputs and user interactions with the media application over time, and may be utilized in the examples of FIGS. 1-3, e.g., in selecting a pause point for resuming a media asset and associating a progress point or pause point of a first user profile with a second user profile. In some embodiments, machine learning techniques may be employed, such as training one or more machine learning models based on data stored at data structure 400 (e.g., labeled as corresponding to a particular user profile), to classify received user interface inputs as likely to be associated with a particular user profile.

In some embodiments, based on the data stored in column 422, the media application may determine when a command (e.g., a pause command or resume command) received from a particular user device or second screen device matches a stored identifier of a particular user device or second screen device. In such instance, a pause point associated with the user interaction profile corresponding to the particular user device or second screen device may be identified as the relevant profile for the current consumption session, and presentation of the media asset may be automatically resumed from the pause point, or resumed after receiving confirmation of the user (e.g., with or without providing any preview frames prior to the resumption). In some embodiments, the media application may store the pause point locally on the user device or second screen device (or on a remote server), to enable a user to resume the media asset from the pause point on his or her user device.

In some embodiments, a confidence score may be generated while a user is navigating to a content item, based on comparing user interface inputs of a current consumption session with one or more attributes stored in data structure 400. For example, the media application may compute confidence scores for respective user interaction profiles with respect to user interface inputs of a current consumption session, e.g., based on a similarity between the stored data attributes and the monitored interactions during the current consumption session. In some embodiments, one or more of the columns of data structure 400 may be weighted based on predictive value to identifying a particular user. For example, if the media application determines an identifier associated with a mobile device being used in a consumption session matches an identifier of a mobile device specified in column 422, such determination may, in some circumstances, be enough on its own to cause a confidence score to be computed that is sufficiently high to select a pause point or progress point associated with the user interaction profile having the matching mobile device identifier.

In some embodiments, the determination of whether to present a preview or not may be dependent on the value of the confidence score described earlier (e.g., a preview may not be presented if the mobile device detected in a current consumption session matches a particular user interaction profile stored in data structure 400). In some embodiments, in response to a computed confidence score exceeding a predetermined threshold, the media application may start pre-fetching a portion of the content (e.g., from the pause point) in order to reduce the time to first byte (TTFB). Such pre-fetching enables the media application to preload (e.g., locally pre-buffer and/or pre-cache) portions of the media asset from the predicted pause point, which can reduce latency in delivery of content to a user, thereby reducing amount of time that a user waits for content to load and enhancing the user experience.

In some embodiments, the media application may predict which pause point to present from among multiple pause points based on historical data associated with various commands (e.g., resume functions) performed in the past. For example, a user might be in the habit of watching a specific series at particular times on particular days. All commands may be collected and associated with a time stamp in order to establish a pattern and predict which pause point to present based on the time a command is received, and additionally, a user's navigation patterns may be tracked and used to identify a user as compared to navigation patterns of other users. For example, one user in a household might scroll quickly to get to section of a screen (e.g., Continue Watching section), while another user might get to the desired content by searching it for it (e.g., by entering the first few letters of the title), e.g., since it might be quicker to get to the content this way. Accordingly, such historical navigation patterns can be used to predict which pause point to present based on users with specific navigation patterns and previously chosen pause points. In some embodiments, navigation profiles may be developed over time based on data collected about how users interact with the system, e.g., scrolling rate, as well as actions received while content is consumed or the manner of consuming content (e.g., perform trick play functions more often than other users, binge-watch, spend a certain time watching per consumption session, whether and how long breaks are taken between episodes, whether and how often a command to skip commercials is selected when available, etc.).

In some embodiments, the media application may delete a stored pause point from data structure 400 in response to receiving user input to resume playback of content from the particular pause point. In some embodiments, the new pause point for a particular user may be updated in response to receiving a pause command or in response to determining that consumption of a media asset is stopped.

Figure 5:
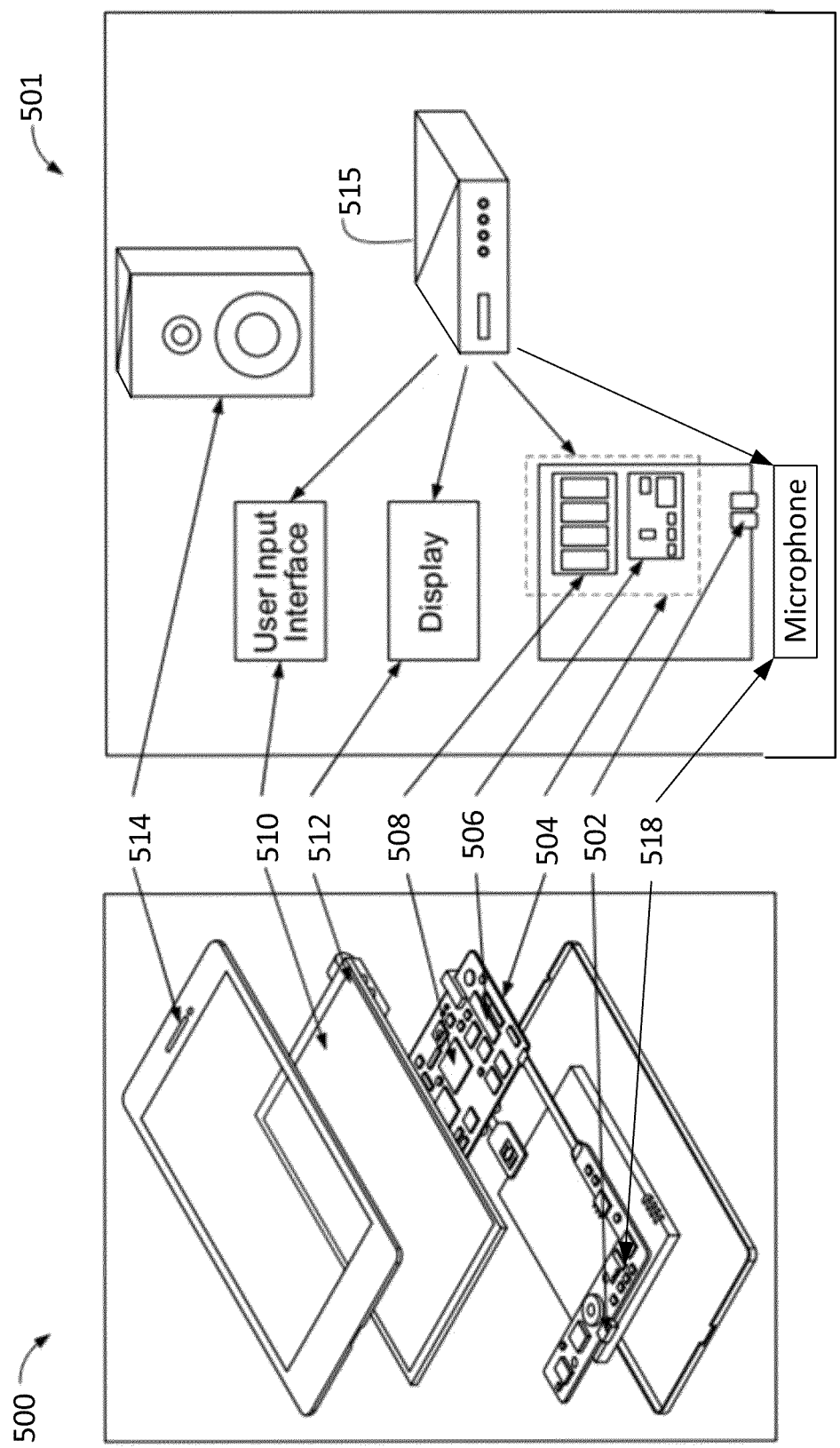
FIG. 5 shows an illustrative user equipment device, in accordance with some embodiments of this disclosure.
Figure 6:
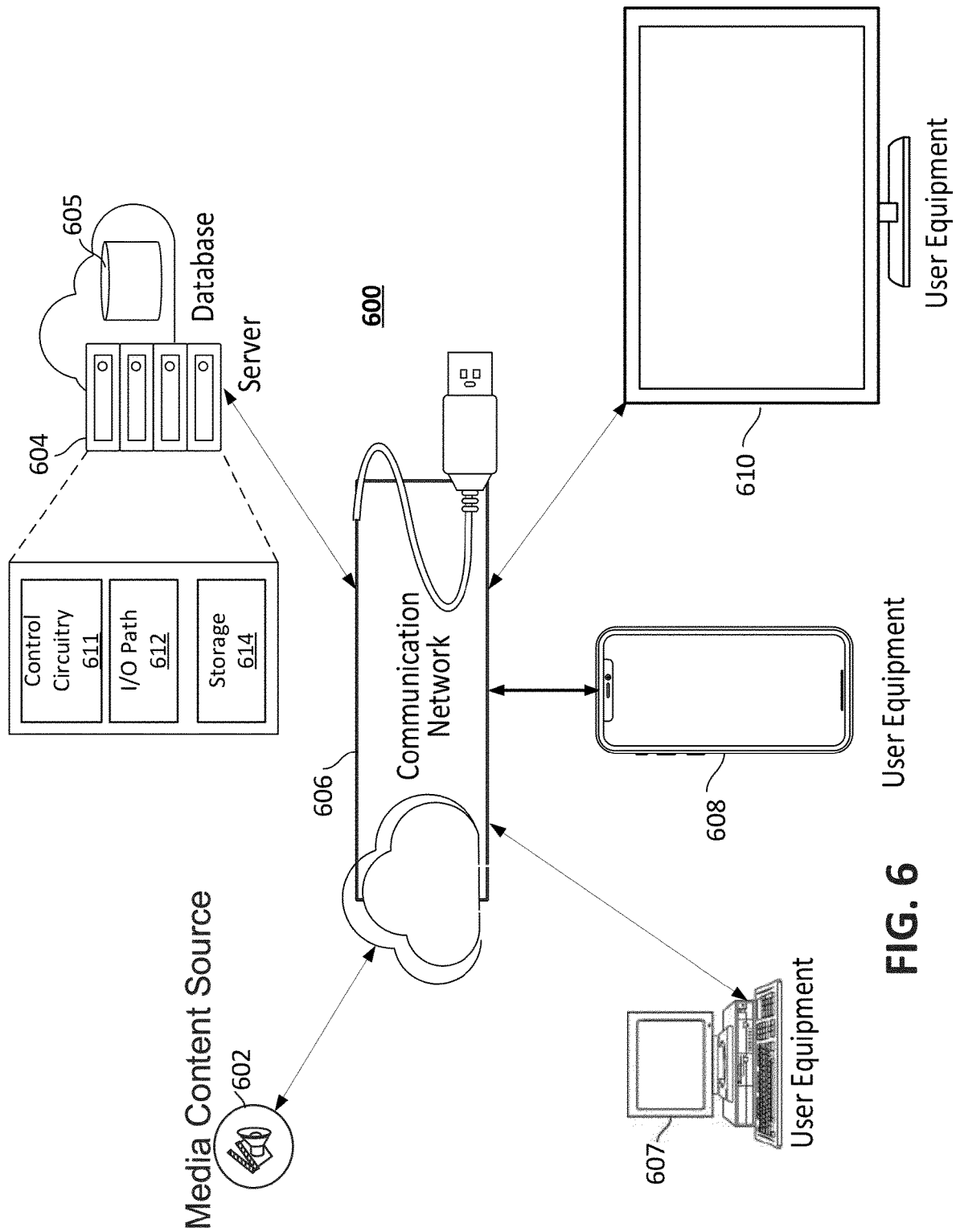
FIG. 6 shows a system, in accordance with some embodiments of this disclosure.

FIGS. 5-6 describe illustrative devices, systems, servers, and related hardware for generating for presentation a media asset starting from a selected pause point and associating a current progress point of a media asset with one or more user profiles associated with a media application account, in accordance with some embodiments of the present disclosure. FIG. 5 shows generalized embodiments of illustrative user equipment devices 500 and 501, which may correspond to, e.g., user equipment device 105 of FIG. 1, user equipment devices 305, 309 of FIG. 3. For example, user equipment device 500 may be a smartphone device. In another example, user equipment device 501 may be a user television equipment system or device. User television equipment device 501 may include set-top box 516. Set-top box 516 may be communicatively connected to microphone 518, speaker 514, and display 512. In some embodiments, microphone 518 may receive voice commands for the media application. In some embodiments, display 512 may be a television display or a computer display. In some embodiments, set-top box 516 may be communicatively connected to user input interface 510. In some embodiments, user input interface 510 may be a remote control device. Set-top box 516 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the media application stored in memory (e.g., storage 508). Specifically, control circuitry 504 may be instructed by the media application to perform the functions discussed above and below. In some implementations, processing or actions performed by control circuitry 504 may be based on instructions received from the media application.

In client/server-based embodiments, control circuitry 504 may include communications circuitry suitable for communicating with a media application server or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. Display 512 may be one or more of a monitor, a television, a display for a mobile device, or any other type of display. A video card or graphics card may generate the output to display 512. The video card may be any control circuitry described above in relation to control circuitry 504. The video card may be integrated with control circuitry 504. Speakers 514 may be provided as integrated with other elements of each one of user equipment device 500 and user equipment system 501 or may be stand-alone units. The audio component of videos and other content displayed on display 512 may be played through the speakers 514. In some embodiments, the audio may be distributed to a receiver (not shown), which processes and outputs the audio via speakers 514.

The media application may be implemented using any suitable architecture. For example, it may be a stand-alone application wholly-implemented on each one of user equipment device 500 and user equipment device 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide supplemental content as discussed. Based on the processed instructions, control circuitry 504 may determine what action to perform when input is received from user input interface 510. For example, movement of a cursor on a display up/down may be indicated by the processed instructions when user input interface 510 indicates that an up/down button was selected.

In some embodiments, the media application is a client/server-based application. Data for use by a thick or thin client implemented on each one of user equipment device 500 and user equipment device 501 is retrieved on-demand by issuing requests to a server remote to each one of user equipment device 500 and user equipment device 501. In one example of a client/server-based guidance application, control circuitry 504 runs a web browser that interprets web pages provided by a remote server. For example, the remote server may store the instructions for the application in a storage device. The remote server may process the stored instructions using circuitry (e.g., control circuitry 511) to perform the operations discussed in connection with FIGS. 1-4.

In some embodiments, the media application may be downloaded and interpreted or otherwise run by an interpreter or virtual machine (run by control circuitry 504). In some embodiments, the media application may be encoded in the ETV Binary Interchange Format (EBIF), received by control circuitry 504 as part of a suitable feed, and interpreted by a user agent running on control circuitry 504. For example, the media application may be an EBIF application. In some embodiments, the media application may be defined by a series of JAVA-based files that are received and run by a local virtual machine or other suitable middleware executed by control circuitry 504. In some of such embodiments (e.g., those employing MPEG-2 or other digital media encoding schemes), the media application may be, for example, encoded and transmitted in an MPEG-2 object carousel with the MPEG audio and video packets of a program.

FIG. 6 is a diagram of an illustrative system 600 for associating a current progress point of a media asset with one or more user profiles associated with a media application account, in accordance with some embodiments of this disclosure. User equipment devices 607, 608, 610 (e.g., which may correspond to one or more of user equipment device 105 of FIG. 1, user equipment devices 305, 309 of FIG. 3) may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602 and server 604. In some embodiments, media content source 602 may correspond to server 604 and/or media content source 602 and server 604 may be under the control of or otherwise associated with a media content provider. In addition, there may be more than one of each of media content source 602 and server 604, but only one of each is shown in FIG. 6 to avoid overcomplicating the drawing. If desired, media content source 602 and server 604 may be integrated as one source device. In some embodiments, the media application may be executed at one or more of control circuitry 611 of server 604 (and/or control circuitry of user equipment devices 607, 608, 610). In some embodiments, database 125 of FIG. 1, which may correspond to database 325 of FIG. 3, and associated with data structure 400 of FIG. 4, may be stored at database 605 maintained at or otherwise associated with server 604.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

In some embodiments, server 604 may retrieve guidance data from media content source 602, process the data as will be described in detail below, and forward the data to user equipment devices 607, 608, 610. Media content source 602 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 602 may be the originator of content (e.g., a television broadcaster, a Webcast provider, etc.) or may not be the originator of content (e.g., an on-demand content provider, an Internet provider of content of broadcast programs for downloading, etc.). Media content source 602 may include cable sources, satellite providers, on-demand providers, Internet providers, over-the-top content providers, or other providers of content. Media content source 602 may also include a remote media server used to store different types of content (including video content selected by a user), in a location remote from any of the client devices. Media content source 602 may also provide supplemental content relevant to the metadata of a particular scene of a media asset as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 604), which may be located centrally or at distributed locations that provide cloud-based services to various types of users and devices connected via a network such as the Internet via communication network 606. In such embodiments, user equipment devices may operate in a peer-to-peer manner without communicating with a central server.

Figure 7:
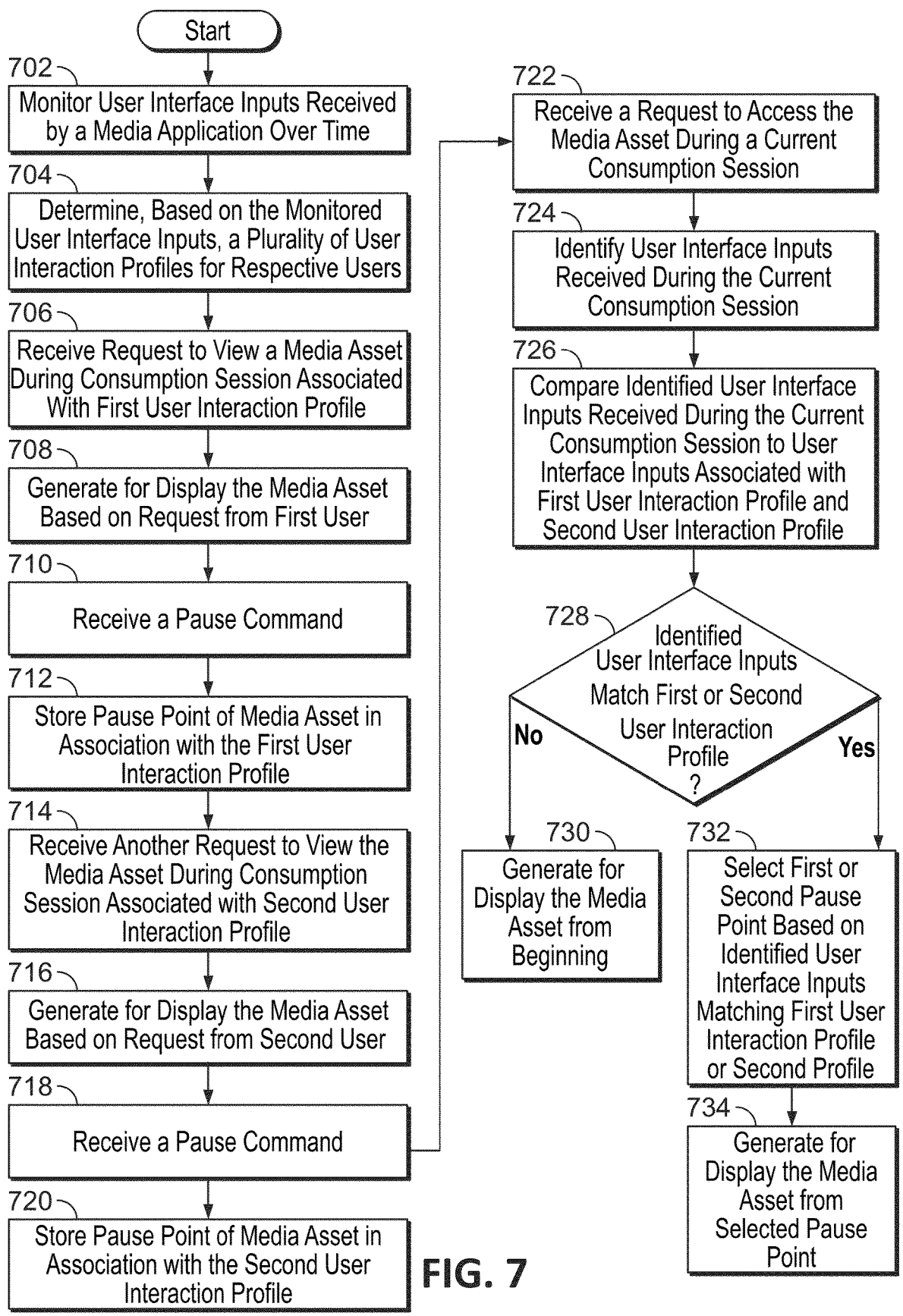
FIG. 7 is a flowchart of a detailed illustrative process for generating for presentation a media asset starting from a selected pause point, in accordance with some embodiments of this disclosure.

FIG. 7 is a flowchart of a detailed illustrative process 700 for generating for presentation a media asset starting from a selected pause point, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At 702, control circuitry (e.g., control circuitry 611 of server 604 of FIG. 6 and/or control circuitry of user equipment device 105 of FIG. 1) may monitor user interface inputs received by a media application (e.g., running at user equipment device 105 and/or server 604) over time. For example, the control circuitry may determine historical navigation patterns and user interface inputs received during consumption of media assets (e.g., as shown at data structure 400 of FIG. 4).

At 704, the control circuitry may determine, based on the monitored user interface inputs, a plurality of user interaction profiles for respective users. For example, the determined historical navigation patterns and user interface inputs may be correlated to respective user interaction profiles (e.g., shown in column 402 of data structure 400 of FIG. 4). In some embodiments, the media application associated with the user interaction profiles may be a shared account or profile in which users do not have individualized accounts (e.g., discerning between users of the account may not be possible via login credentials or by selecting a particular profile).

At 706, the control circuitry may receive a request (e.g., via user interface 103 of FIG. 1) to view a media asset during a consumption session associated with a first user interaction profile (e.g., a profile tracking historical user interface inputs and consumption data of user 102, which may be transparent to user 102).

At 708, the control circuitry may generate for display the media asset (e.g., media asset 126 of FIG. 1, on user equipment device 105 of FIG. 1) based on a request from a first user (e.g., user 102 associated with a first user interaction profile). For example, the control circuitry may generate for display the media asset in response to receiving selection of identifier 108.

At 710, the control circuitry may receive a pause command (e.g., associated with icon 128 of FIG. 1 provided via user interface 109 of FIG. 1, such as via a remote control device coupled to user equipment device 105) to freeze the playing of the media asset (e.g., media asset 126 of FIG. 1) at pause point 124.

At 712, in response to receiving the pause command, the control circuitry may cause an indication of pause point 124 to be stored (e.g., in association with the first interaction user profile at database 125 of FIG. 1) in association with a time stamp of the media asset when the pause command is received. In some embodiments, metadata associated with the partially consumed media asset and/or user interface inputs associated with the current consumption session may be stored in connection with the pause point.

At 714, the control circuitry may receive another request to view the media asset (e.g., media asset 126 of FIG. 1, on user equipment device 105 of FIG. 1 or any other suitable device) during a consumption session associated with a second user interaction profile. The request may be received from a second user (e.g., user 104 of FIG. 1), and the consumption session may be associated with the same user account or profile as the first consumption session associated with the first user, but occurring subsequent in time to such first consumption session.

At 716, the control circuitry may generate for display the media asset (e.g., the same media asset associated with the stored pause point of the first consumption session, media asset 126 of FIG. 1, for display on user equipment device 105 of FIG. 1 or any other suitable device) based on a request from the second user.

At 718, the control circuitry may receive a pause command (e.g., associated with icon 128 provided by user interface 111 of FIG. 1, such as via a remote control device coupled to user equipment device 105) to freeze the playing of the media asset (e.g., media asset 126 of FIG. 1) at pause point 130. Pause point 130 may correspond to a different location within media asset 126 than stored pause point 124.

At 720, in response to receiving the pause command at 718, the control circuitry may cause an indication of pause point 130 to be stored (e.g., in association with the second interaction user profile at database 125 of FIG. 1) in association with a time stamp of the media asset when the pause command is received. In some embodiments, metadata associated with the partially consumed media asset and/or user interface inputs associated with the current consumption session may be stored in connection with the pause point.

At 722, the control circuitry may receive a request to access the media asset (e.g., media asset 126 of FIG. 1, on user equipment device 105 of FIG. 1 or any other suitable device) during a current consumption session, occurring after the first and second consumption sessions respectively associated with pause point 124 and 130. Such request may be received from, e.g., user 102 or user 104 of FIG. 1, although the control circuitry may not be able to determine which user is associated with the current consumption session based on login credentials alone, since users 102 and 104 may each access a single shared account or profile.

At 724, the control circuitry may identify user interface inputs received during the current consumption session. For example, the control circuitry may determine that the request received at 722 is associated with selecting identifier 108 from media category 116, or the control circuitry may determine that the request received at 722 is associated with selecting identifier 108 based on a search query received at portion 120 of user interface 107. In some embodiments, the control circuitry may take into account any number of suitable inputs or interactions, e.g., the various attributes shown in data structure 400 of FIG. 4.

At 726, the control circuitry may compare the identified user interface inputs received during the current consumption session to user interface inputs associated with the first user interaction profile and second user interaction profile, e.g., stored in association with data structure 400 of FIG. 4. In some embodiments, the control circuitry may generate respective confidence scores based on a degree of similarity between the identified user interface inputs and the stored user interface inputs for each of the first user interaction profile (e.g., associated with user 102) and the second user interaction profile (e.g., associated with user 104).

At 728, the control circuitry may determine whether the identified user interface inputs match the first or second user interaction profile. In some embodiments, the control circuitry may perform the determination by selecting the user interaction profile having the higher confidence score as an indicator of a match. In some embodiments, the control circuitry may determine there is a match only if a particular user interaction profile is associated with a confidence score that exceeds a certain predefined threshold (e.g., 50%), and may select the user interaction profile having the higher confidence score if each confidence score exceeds the threshold.

At 730, the control circuitry may, in response to determining that neither of the first user interaction profile or the second user interaction profile constitutes a match, generate for display the media asset (e.g., media asset 126 of FIG. 1, on user equipment device 105 of FIG. 1 or any other suitable device) from the beginning. The control circuitry may perform this action based on the inference that the user of the current consumption session may be a new user, since the detected user interface inputs do not correspond to historical data of the user interaction profiles. In some embodiments, the control circuitry may provide a prompt asking the user whether he or she previously viewed the media asset, and in response to receiving an affirmative selection, present preview of stored pause points to the user, such as described in the example illustrated in FIG. 3.

At 732, the control circuitry may select the first or second pause point based on identified user interface inputs matching the first user interaction profile or the second profile. For example, the control circuitry may select the first pause point (e.g., pause point 124 of FIG. 1) in response to determining that the comparison at 726 results in a match between the first user interaction profile and the user interface inputs of the current consumption session.

At 734, the control circuitry may generate for display the media asset (e.g., media asset 126 of FIG. 1, on user equipment device 105 of FIG. 1 or any other suitable device) from the selected pause point (e.g., pause point 124). In some embodiments, such generating for display may be performed automatically. In some embodiments, the user may be prompted to confirm to begin playing of the media asset at the selected pause point.

Figure 8:
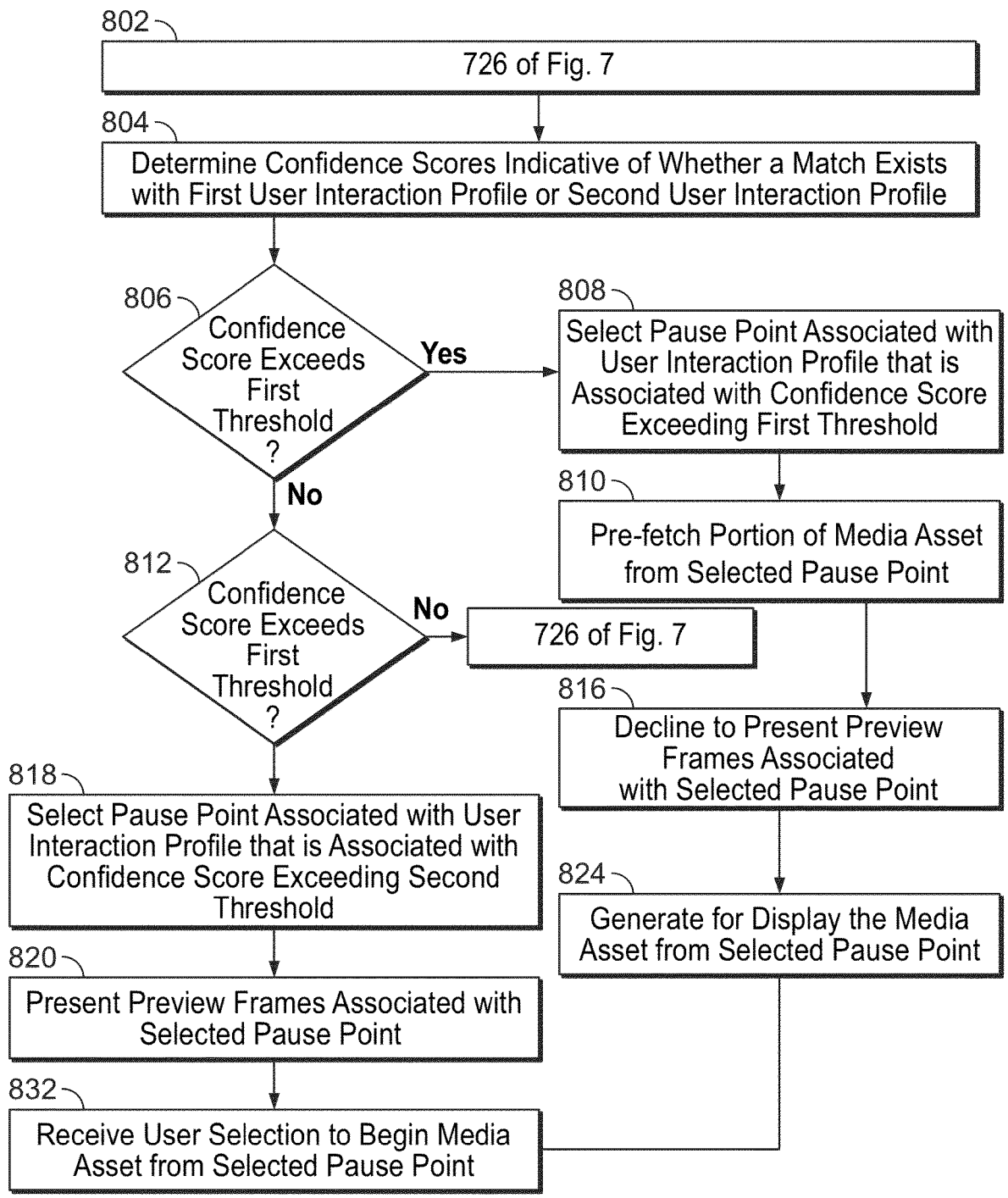
FIG. 8 is a flowchart of a detailed illustrative process for generating for presentation a media asset starting from a selected pause point, in accordance with some embodiments of this disclosure.

FIG. 8 is a flowchart of a detailed illustrative process for generating for presentation a media asset starting from a selected pause point, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At 802, control circuitry (e.g., control circuitry 611 of server 604 of FIG. 6 and/or control circuitry of user equipment device 105 of FIG. 1) may perform 726 of FIG. 7, to compare identified user interface inputs received during the current consumption session to user interface inputs associated with the first user interaction profile and the second user interaction profile.

At 804, the control circuitry may determine confidence scores indicative of whether a match exists with the first user interaction profile or the second user interaction profile. For example, the control circuitry may monitor user inputs with user interface 103 to determine values for one or more of the attributes shown in columns 402-422 of FIG. 4, and compare each value to respective values for such attributes associated with the first user interaction profile and the second user interaction profile.

At 806, the control circuitry may determine whether the computed confidence scores associated with the first interaction profile and the second interaction profile exceed a first threshold (e.g., 75%). In response to determining one or more of the computed confidence scores exceed the first threshold, processing may proceed to 808. On the other hand, in response to determining one or more of the computed confidence scores do not exceed the first threshold, processing may proceed to 812.

At 808, the control circuitry may select a pause point (e.g., pause point 124 of FIG. 1) associated with a user interaction profile that is associated with the confidence score exceeding the first threshold. If each of the computed confidence scores associated with the first interaction profile and the second interaction profile exceeds the first threshold, the control circuitry may choose the higher of the two scores.

At 810, the control circuitry may pre-fetch a portion of the media asset (e.g., media asset 126 of FIG. 1, on user equipment device 105 of FIG. 1 or any other suitable device) from the selected pause point (e.g., pause point 124 of FIG. 1). For example, the control circuitry may pre-fetch any suitable number of segments from a manifest of the media asset, to buffer such segments in anticipation of the user resuming the media asset from the selected pause point. At 816, the control circuitry may decline to present preview frames associated with the selected pause point, based on the fact that the relatively high confidence score (e.g., exceeding the first threshold) associated with the selected pause point indicates a high level of certainty that the selected pause point is correctly matched to the user interaction profile associated with the current consumption session.

At 812, the control circuitry may, in response to determining that neither of the computed confidence scores exceeds the first threshold, determine whether one or more of the confidence scores exceed the second threshold (e.g., 50%). If the control circuitry determines that neither of the computed confidence scores exceeds the first threshold, processing may proceed to 726 of FIG. 7. On the other hand, if the control circuitry determines that at least one of the computed confidence scores exceeds the first threshold, processing may proceed to 818.

At 818, the control circuitry may select a pause point (e.g., pause point 124 of FIG. 1) associated with a user interaction profile that is associated with the confidence score exceeding the second threshold (e.g., 50%). If each of the computed confidence scores associated with the first interaction profile and the second interaction profile exceeds the second threshold, the control circuitry may choose the higher of the two scores.

At 820, the control circuitry may present preview frames associated with the selected pause point (e.g., pause point 124 of FIG. 1). For example, the control circuitry may generate for display user interface 201 of FIG. 2 depicting multiple pause points and corresponding preview frames for media asset 126. At 820, user interface 205 may be generated for presentation by the control circuitry to depict each pause point, and respective previews, of each media asset in media asset collection 226 (e.g., the episodic series "Outer Banks").

At 822, the control circuitry may receive user selection to being the media asset (e.g., media asset 126 of FIG. 1, on user equipment device 105 of FIG. 1 or any other suitable device) from the selected pause point. In some embodiments, such confirmation from the user may be be presented only if the confidence score is below the second threshold, or such confirmation from the user may not be received at all, e.g., the media asset may be automatically generated for display from the selected pause point. 824 may be performed in a similar manner to 734 of FIG. 7.

Figure 9:
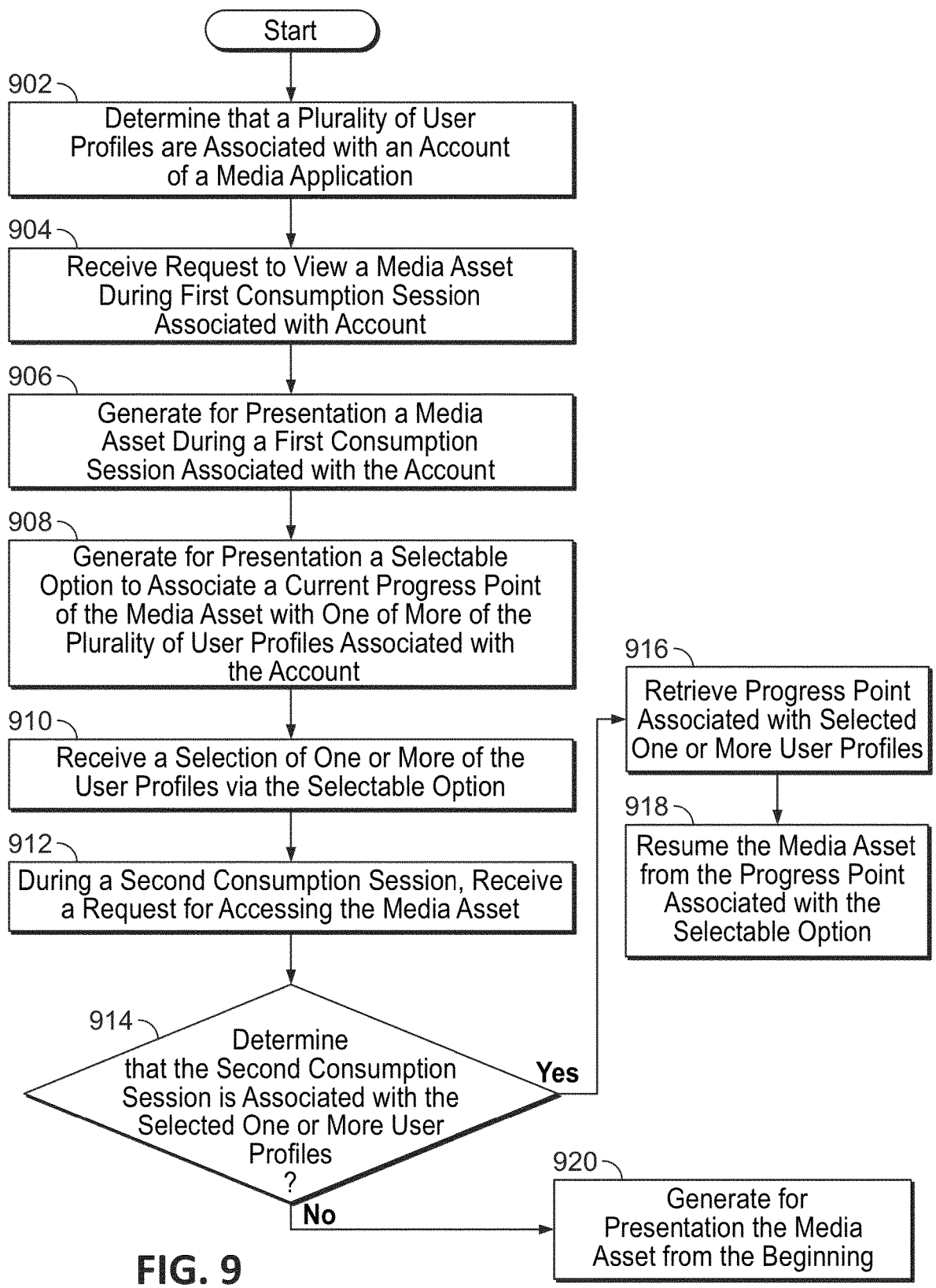
FIG. 9 is a flowchart of a detailed illustrative process for associating a current progress point of a media asset with one or more user profiles associated with a media application account, in accordance with some embodiments of this disclosure.

FIG. 9 is a flowchart of a detailed illustrative process 900 for associating a current progress point of a media asset with one or more user profiles associated with a media application account, in accordance with some embodiments of this disclosure. In various embodiments, the individual steps of process 900 may be implemented by one or more components of the devices and systems of FIGS. 1-6. Although the present disclosure may describe certain steps of process 900 (and of other processes described herein) as being implemented by certain components of the devices and systems of FIGS. 1-6, this is for purposes of illustration only, and it should be understood that other components of the devices and systems of FIGS. 1-6 may implement those steps instead.

At 902, control circuitry (e.g., control circuitry 611 of server 604 of FIG. 6 and/or control circuitry of user equipment device 105 of FIG. 1) may determine that a plurality of user profiles (e.g., profiles 321, 323 of FIG. 3) are associated with an account of a media application, e.g., a shared account having common login credentials, where multiple users may be permitted to maintain personalized profiles that track each user's user interface inputs, navigation history and historical consumption habits.

At 904, the control circuitry may receive a request (e.g., from user 302 of FIG. 3, via user interface 303 provided by the media application) to view a media asset (e.g., media asset 326 of FIG. 3) during a first consumption session (e.g., associated with the first user 302) associated with the media account. The first consumption session may correspond to a group watching session, such as, for example, where users 302 and 304, each associated with a respective user profile, are consuming one or more media assets in a group consumption session.

At 906, the control circuitry may generate for presentation the media asset (e.g., media asset 326 of FIG. 3) during the first consumption session associated with the account.

At 908, the control circuitry may generate for presentation a selectable option (e.g., selectable option 331 of FIG. 3) to associate a current progress point (e.g., progress point 324 of FIG. 3) of the media asset with one or more of the plurality of user profiles (e.g., user profile 323) associated with the account.

At 910, control circuitry may receive a selection (e.g., an affirmative selection of "Yes" in connection with user profile 323 of FIG. 3) of one or more of the user profiles via the selectable option (e.g., selectable option 331 of FIG. 3). In some embodiments, the selectable option may be presented in a manner that enables a user to select multiple user profiles at once with which to associate the progress point (e.g., progress point 324 of FIG. 3). For example, the selectable option may comprise an overlay or pop-up showing each user profile of the media account and corresponding user interface portions that enable a user to select the desired number of user profiles. In some embodiments, the control circuitry may cause the selectable option to be displayed on a second screen device (e.g., user device 309 of FIG. 3), and selection may be received at such device and transmitted to user equipment device 305 and/or server 604 for processing.

At 912, the control circuitry may, during a second consumption session, receive a request for accessing the media asset (e.g., media asset 326 of FIG. 3). For example, the second consumption session may be associated with user 304, and may occur at a later time than the first consumption session. The request for accessing the media asset may be received by detecting, via user interface 307, user selection of identifier 308.

At 914, the control circuitry may determine that the second consumption session is associated with the selected one or more user profiles. For example, the control circuitry may compare the selected one or more user profiles (e.g., user profile 323, associated with an indication of progress point 324 of FIG. 3, in data structure 400 of FIG. 4, by way of selectable option 331 of FIG. 3) to the user profile selected during the second user consumption session to determine whether there is a match. If, however, at 914, the control circuitry determines that the second consumption decision is not associated with a particular profile, processing may proceed to 920.

At 916, in response to determining that the selected one or more user profiles matches the user profile of the second consumption session, the control circuitry may retrieve an indication of the progress point (e.g., from column 406 of FIG. 4) and request the media asset (e.g., from server 604 of FIG. 6) from the progress point.

At 918, the control circuitry may resume the media asset (e.g., media asset 326 of FIG. 3) from the progress point associated with the selectable option (e.g., progress point 324 of FIG. 3). In some embodiments, such resumption may be performed automatically, or in response to receiving a confirmatory input from the user.

At 920, the control circuitry may generate for display the media asset (e.g., media asset 326 of FIG. 3) from the beginning, e.g., since no progress points are determined to be associated with the particular media asset for the current user profile, the user may be determined to have not yet consumed the media asset during any other consumption session.

Figure 10:
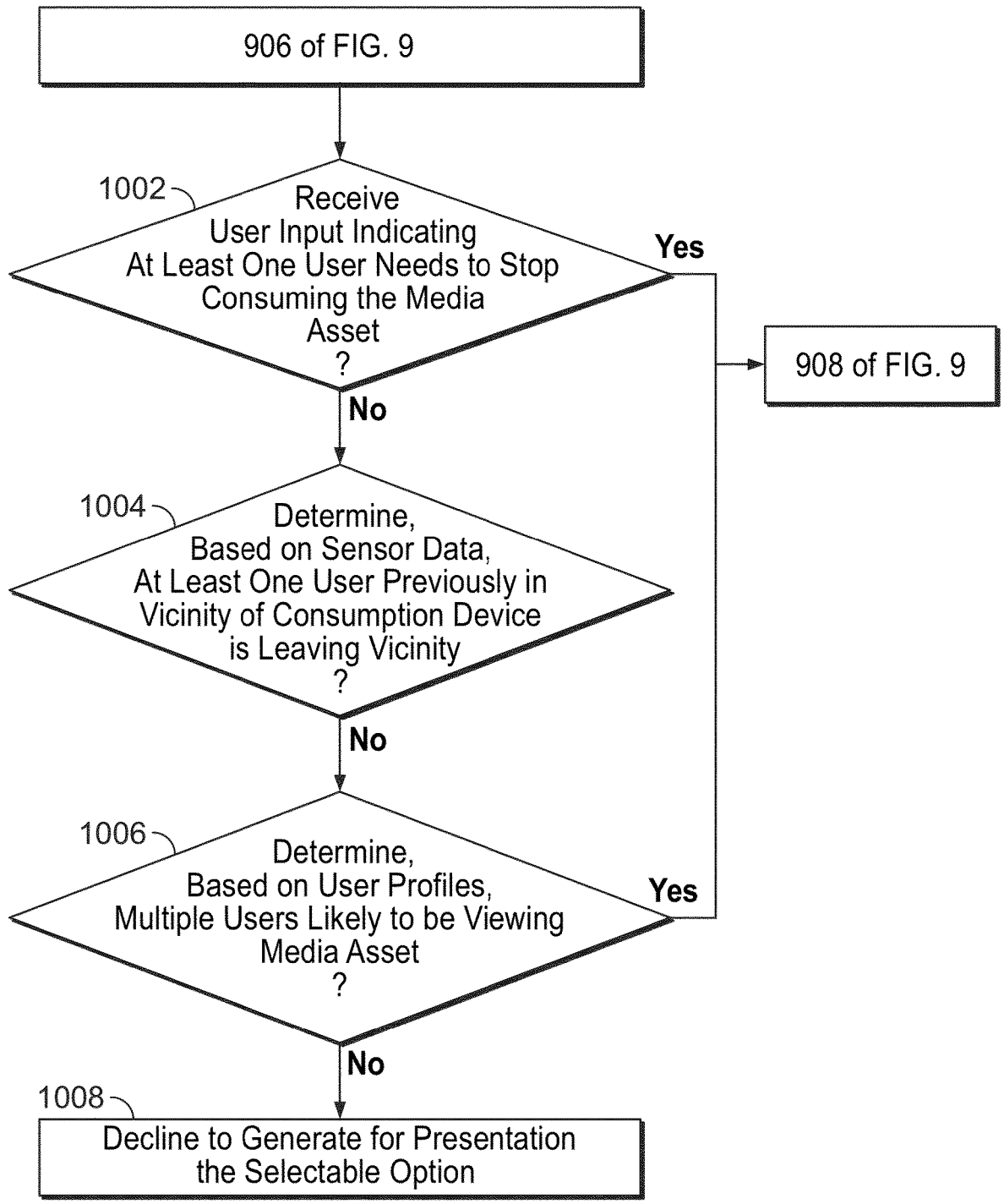
FIG. 10 is a flowchart of a detailed illustrative process for determining whether to present a selectable option to associate a current progress point of a media asset with one or more user profiles associated with a media application account, in accordance with some embodiments of this disclosure.

FIG. 10 is a flowchart of a detailed illustrative process 1000 for determining whether to present a selectable option to associate a current progress point of a media asset with one or more user profiles associated with a media application account, in accordance with some embodiments of this disclosure. In various embodiments, the individual steps of process 1000 may be implemented by one or more components of the devices and systems of FIGS. 1-6. Although the present disclosure may describe certain steps of process 1000 (and of other processes described herein) as being implemented by certain components of the devices and systems of FIGS. 1-6, this is for purposes of illustration only, and it should be understood that other components of the devices and systems of FIGS. 1-6 may implement those steps instead.

At 1002, control circuitry (e.g., control circuitry 611 of server 604 of FIG. 6 and/or control circuitry of user equipment device 105 of FIG. 1) may determine whether user input indicating at least one user needs to stop consuming the media asset is received. For example, user interface 303 provided by the media application at user equipment device 305 may provide a prompt for user 302 to indicate one or more other users participating in the current consumption session. In the absence of such input, processing may proceed to 1004. Otherwise, processing may proceed to 908 of FIG. 9, to provide a selectable option to the user to associate the progress point (e.g., progress point 324 of FIG. 3) with one or more profiles.

At 1004, the control circuitry may determine, based on sensor data, whether at least one user previously in the vicinity of user equipment device is leaving the vicinity of the user equipment device. For example, the control circuitry may receive sensor data from a camera, and process such sensor data, e.g., to perform facial recognition techniques to identify users in the captured image, such as by comparing extracted facial features from the image to facial features of an image of a user stored in association with a user profile of the account). Any suitable biometric sensor or other sensor may be used to ascertain the presence of a user (e.g., user 304) in the vicinity of the user equipment device (e.g., user equipment device 305), and the subsequent exiting of such user from the vicinity. In response to an affirmative determination at 1004, processing may proceed to 908 of FIG. 9. Otherwise, processing may proceed to 1006.

At 1006, the control circuitry may determine, based on one or more user profiles (e.g., stored at data structure 400 of FIG. 4), whether multiple users are likely to be viewing the media asset. For example, if the control circuitry determines that user 304 recently viewed the prior episode of media asset 326 (e.g., at a similar time to the current time), the control circuitry may determine that user 304 is likely to be consuming media asset 326 with user 302 in a group session. In response to an affirmative determination at 1004, processing may proceed to 908 of FIG. 9. Otherwise, processing may proceed to 1008.

At 1008, the control circuitry may decline to generate for presentation the selectable option (e.g., selectable option 331 of FIG. 3). 1008 may be performed based on a determination that there is a lack of any indicators that user 302 is accompanied by any other users having user profiles associated with the user account of the media application, and thus there may be no need to provide the selectable option to associate a progress point with another profile.

Figure 11:
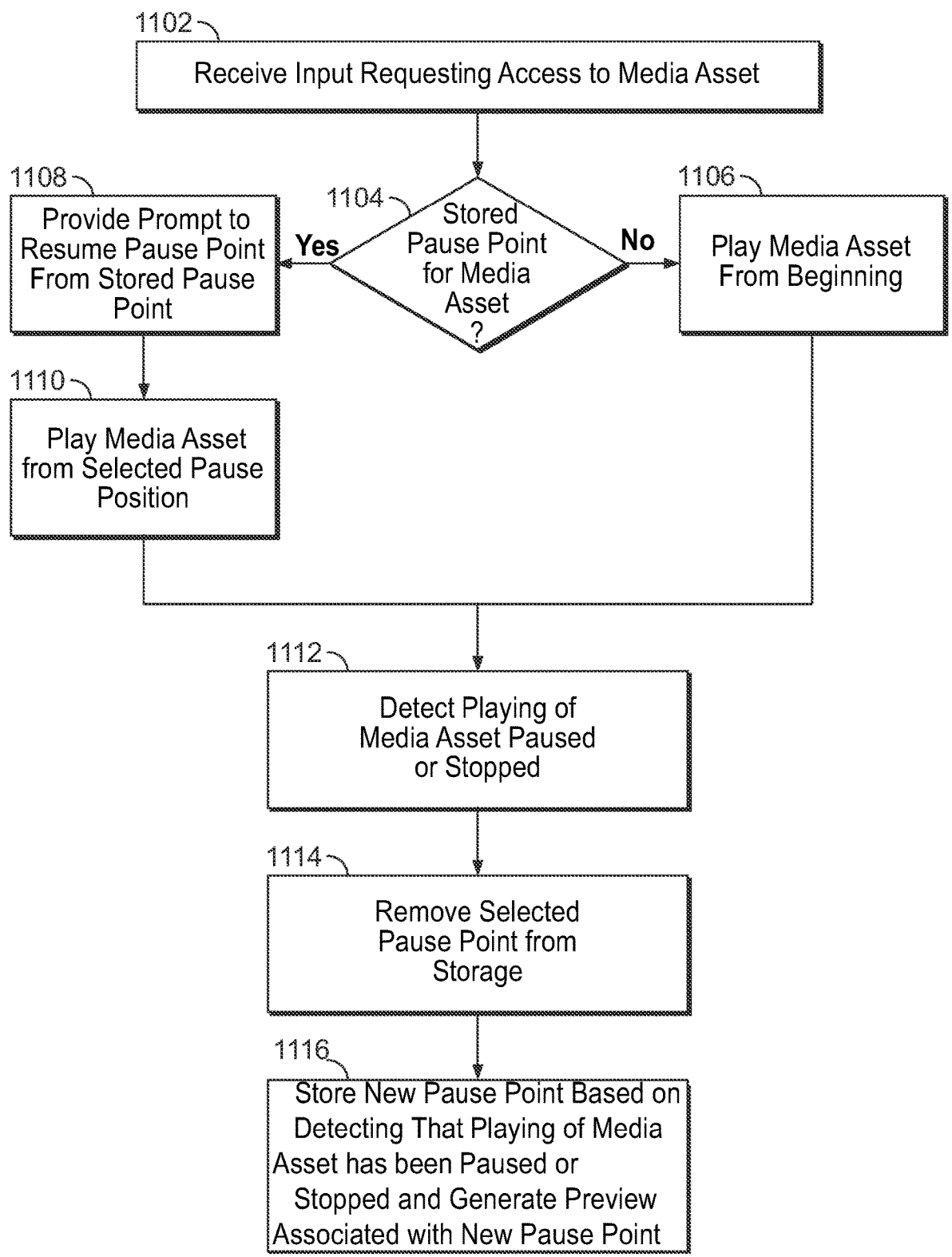
FIG. 11 is a flowchart of a detailed illustrative process for storing a new pause point with a preview, in accordance with some embodiments of this disclosure.

FIG. 11 is a flowchart of a detailed illustrative process for storing a new pause point with a preview, in accordance with some embodiments of this disclosure. In various embodiments, the individual steps of process 1100 may be implemented by one or more components of the devices and systems of FIGS. 1-6. Although the present disclosure may describe certain steps of process 1100 (and of other processes described herein) as being implemented by certain components of the devices and systems of FIGS. 1-6, this is for purposes of illustration only, and it should be understood that other components of the devices and systems of FIGS. 1-6 may implement those steps instead.

At 1102, control circuitry (e.g., control circuitry 611 of server 604 of FIG. 6 and/or control circuitry of user equipment device 105 of FIG. 1) may receive input requesting access to a media asset (e.g., media asset 126 of FIG. 1, such as by way of selecting identifier 108). At 1104, the control circuitry may determine whether the user profile or user account associated with the current consumption session stores an indication of one or more pause points for the requested media asset. If yes, processing may proceed to 1108; otherwise, processing may proceed to 1106. At 1106, the control circuitry may cause the media asset to be generated for display from the beginning. At 1108, the control circuitry may provide a prompt to the user requesting confirmation of a particular pause point from which the media asset should be resumed. Alternatively, the media asset may be automatically resumed from a predicted pause point, using the techniques discussed in connection with FIG. 1.

At 1110, the control circuitry may play the media asset from the selected pause position (e.g., pause position 124 of media asset 126 of FIG. 1). At 1112, the control circuitry may detect that during the current consumption session, a pause command has been received, the device being used to consumed the media asset has been turned off (e.g., user equipment 105 of FIG. 1) or the user exited out of the media application or otherwise ceased consumption of the media asset. At 1114, the control circuitry may remove the selected pause point (e.g., pause point 124) from storage and overwrite or replace such pause point with a new pause point corresponding to the point of the media asset at which the user ceased access of the media asset at 1112. At 1116, the control circuitry may store such new pause point (e.g., at storage 614 of server 604 of FIG. 6) based on such detecting that playing of the media asset paused or stopped at 1112, and generate a preview (e.g., a 4-10 second clip) of one or more frames associated with the new pause point.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    storing an identification of a first progress point of a media asset associated with a first user profile;
    storing an identification of a second progress point of the media asset with a second user profile;
    comparing patterns of user interface inputs received during a current consumption session with a first set of navigation patterns of user interface inputs associated with the first user profile and with a second set of navigation patterns of user interface inputs associated with the second user profile;
    selecting one of the first progress point or the second progress point as a selected progress point based on whether the comparing indicates that the patterns of user interface inputs correspond with the first set of navigation patterns or the second set of navigation patterns;
    pre-fetching a portion of the media asset associated with the selected progress point;
    based on receiving input in relation to the media asset during the current consumption session, generating for presentation the media asset starting with the pre-fetched portion of the media asset associated with the selected progress point.

2. The method of claim 1, wherein each of the first set of navigation patterns and the second navigation patterns is based on at least one of: a type, a number of types, a frequency of types, or a time the user interface inputs associated with each respective user profile was received during a consumption session.

3. The method of claim 2, wherein the type of user interface inputs is based on at least one of:
    requests to access a most commonly accessed portion of a media asset, search query commands, scroll commands, a scrolling rate, requests to perform trick-play functions, or requests to skip supplemental content.

4. The method of claim 1, wherein the comparing the patterns of user interface inputs received during the current consumption session with the first set of navigation patterns and with the second set of navigation patterns is based in part on:
    matching at least one of a type, a number of types, a frequency of types, or a time the user interface inputs associated with each respective user profile was received during a consumption session with at least one of a type, a number of types, a frequency of types, or a time the user interface inputs of the current consumption session were received.

5. The method of claim 1, further comprising:
    identifying navigation patterns based on monitoring user interface inputs received over time; and determining, based on the identified navigation patterns, a plurality of user profiles for respective users of the first and second user profiles.

6. The method of claim 1, wherein generating for presentation the media asset starting with the pre-fetched portion of the media asset associated with the selected progress point further comprises:
generating for presentation a preview frame associated with the selected progress point.

7. The method of claim 1, further comprising:
based on the comparing indicating that the patterns of user interface inputs correspond with a set of navigation patterns, generating for presentation the media asset starting with the pre-fetched portion of the media asset associated with the selected progress point without generating for presentation a preview of the media asset.

8. The method of claim 1, wherein:
the media asset is being generated for display on a first device;
the first progress point is associated with a playback control of the media asset, generated for display on the first device, based on receiving a playback control command from a second device; and
wherein the comparing indicates that the patterns of user interface inputs correspond with the navigation patterns of the first or second user profile is further based on determining the request to access the media asset was received from the second device.

9. The method of claim 1, further comprising:
generating for presentation respective previews for each of the first and second progress points of the media asset.

10. The method of claim 9, wherein generating for presentation respective previews for each of the first and second progress points of the media asset comprises:
generating for presentation, for each respective point of the first and second progress points, a frame of the media asset prior to the progress point, wherein the preview for the second progress point comprises a frame of the media asset occurring prior to the second progress point and after the first progress point.

11. The method of claim 1, wherein pre-fetching the portion of the media asset associated with the selected progress point comprises buffering the portion of the media asset at a device, prior to the device receiving the request to access the media asset, and prior to playing the media asset, during the current consumption session.

12. The method of claim 1, wherein:
the first progress point is stored based on a first prior consumption session during which a first user associated with the first user profile consumed the media asset without a second user;
the second progress point is stored based on a second prior consumption session during which the second user associated with the second user profile consumed the media asset without the first user; and
the current consumption session is associated with either the first user consuming the media asset without the second user, or the second user consuming the media asset without the first user.

13. A system comprising:
control circuitry configured to:
store an identification of a first progress point of a media asset associated with a first user profile;
store an identification of a second progress point of the media asset with a second user profile;
compare patterns of user interface inputs received during a current consumption session with a first set of navigation patterns of user interface inputs associated with the first user profile and with a second set of navigation patterns of user interface inputs associated with the second user profile;
select one of the first progress point or the second progress point as a selected progress point based on whether the comparing indicates that the patterns of user interface inputs correspond with the first set of navigation patterns or the second set of navigation patterns;
pre-fetching a portion of the media asset associated with the selected progress point; and
input/output circuitry configured to:
based on receiving input in relation to the media asset during the current consumption session, generate for presentation the media asset starting with the pre-fetched portion of the media asset associated with the selected progress point.

14. The system of claim 13, wherein each of the first set of navigation patterns and the second navigation patterns is based on at least one of: a type, a number of types, a frequency of types, or a time the user interface inputs associated with each respective user profile was received during a consumption session.

15. The system of claim 14, wherein the type of user interface inputs is based on at least one of:
requests to access a most commonly accessed portion of a media asset, search query commands, scroll commands, a scrolling rate, requests to perform trick-play functions, or requests to skip supplemental content.

16. The system of claim 13, wherein the comparing the patterns of user interface inputs received during the current consumption session with the first set of navigation patterns and with the second set of navigation patterns is based in part on:
matching at least one of a type, a number of types, a frequency of types, or a time the user interface inputs associated with each respective user profile was received during a consumption session with at least one of a type, a number of types, a frequency of types, or a time the user interface inputs of the current consumption session were received.

17. The system of claim 13, wherein the input/output circuitry configured to generate for presentation the media asset starting with the pre-fetched portion of the media asset associated with the selected progress point is further configured to:
generate for presentation a preview frame associated with the selected progress point.

18. The system of claim 13, wherein:
the media asset is being generated for display on a first device;
the first progress point is associated with a playback control of the media asset, generated for display on the first device, based on receiving a playback control command from a second device; and
wherein the comparing indicates that the patterns of user interface inputs correspond with the navigation patterns of the first or second user profile is further based on determining the request to access the media asset was received from the second device.

19. The system of claim 13, wherein the input/output circuitry is further configured to:
generate for presentation respective previews for each of the first and second progress points of the media asset.

20. The system of claim 19, wherein generating for presentation respective previews for each of the first and second progress points of the media asset comprises:
generating for presentation, for each respective point of the first and second progress points, a frame of the media asset prior to the progress point, wherein the preview for the second progress point comprises a frame of the media asset occurring prior to the second progress point and after the first progress point.

* * * * *